(12) United States Patent
Kato et al.

(10) Patent No.: US 11,077,397 B2
(45) Date of Patent: Aug. 3, 2021

(54) HONEYCOMB FILTER

(71) Applicant: NGK INSULATORS, LTD., Nagoya (JP)

(72) Inventors: Yasushi Kato, Nagoya (JP); Takahiro Kondo, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 467 days.

(21) Appl. No.: 15/950,509

(22) Filed: Apr. 11, 2018

(65) Prior Publication Data

US 2018/0326340 A1    Nov. 15, 2018

(30) Foreign Application Priority Data

May 12, 2017 (JP) ............................. JP2017-095956

(51) Int. Cl.
*B01D 46/24* (2006.01)
*B01J 35/04* (2006.01)
(Continued)

(52) U.S. Cl.
CPC ....... *B01D 46/247* (2013.01); *B01D 46/2455* (2013.01); *B01J 35/04* (2013.01); *B01D 53/94* (2013.01); *B01D 53/9418* (2013.01); *B01D 2046/2481* (2013.01); *B01D* (Continued)

(58) Field of Classification Search
CPC .............. B01D 46/247; B01D 46/2455; B01D 46/2429; B01D 46/2451; B01D 2046/2481; B01D 2046/2485; B01D 2046/2492; B01D 2046/2496; B01D 2255/50; B01D 2255/915; B01D 2255/9155; B01D 53/94; B01D 53/9418; B01D 2279/30;
(Continued)

(56) References Cited

U.S. PATENT DOCUMENTS

2010/0257830 A1   10/2010  Mizutani
2014/0272279 A1*   9/2014  Aoyama ............. C04B 38/0009
                                                              428/118
(Continued)

FOREIGN PATENT DOCUMENTS

DE    10 2015 011 430 A1    3/2016
EP         2 495 027 A1     9/2012
JP         S58-150015 A     9/1983
JP         2009-154124 A    7/2009
JP         2010-053697 A    3/2010
(Continued)

OTHER PUBLICATIONS

German Office Action (with English translation), German Application No. 10 2018 205 716.8, dated Jul. 1, 2020 (5 pages).
(Continued)

*Primary Examiner* — Lucas A Stelling
*Assistant Examiner* — Hafiz Muhammad Aamir
(74) *Attorney, Agent, or Firm* — Burr & Brown, PLLC

(57) ABSTRACT

A honeycomb filter includes a plugged honeycomb structure body which has cell rows arranged along one direction, in a cross section of the honeycomb structure body and including a first cell row constituted of at least one of an inflow cell and an outflow cell, and a through-cell, and a second cell row including no through-cells. A width P1 (mm) of the first cell row, a width P2 (mm) of the second cell row and a curvature radius R (μm) of a curved shape of corner portions of a polygonal shape of each cell satisfy a relation of Equation (1) below: Equation (1): 0.4 (R/1000)/((P1+P2)/2) 100 20.

12 Claims, 19 Drawing Sheets

(51) Int. Cl.
*B01D 53/94* (2006.01)
*F01N 3/022* (2006.01)
(52) U.S. Cl.
CPC ......... 2046/2485 (2013.01); *B01D 2046/2492* (2013.01); *B01D 2046/2496* (2013.01); *B01D 2255/50* (2013.01); *B01D 2255/915* (2013.01); *B01D 2255/9155* (2013.01); *B01D 2279/30* (2013.01)
(58) Field of Classification Search
CPC ....... B01D 2258/012; B01D 2258/0238; B01J 35/04; F01N 3/0222
See application file for complete search history.

(56) References Cited

U.S. PATENT DOCUMENTS

| | | |
|---|---|---|
| 2016/0067653 A1 | 3/2016 | Miyairi et al. |
| 2016/0069308 A1 | 3/2016 | Miyairi et al. |

FOREIGN PATENT DOCUMENTS

| | | |
|---|---|---|
| JP | 2010-221159 A1 | 10/2010 |
| JP | 2012-184660 A1 | 9/2012 |
| JP | 2012-210581 A1 | 11/2012 |
| JP | 2016-052635 A | 4/2016 |
| WO | 2012/046484 A1 | 4/2012 |

OTHER PUBLICATIONS

Japanese Office Action (with English translation), Japanese Application No. 2017-095956, dated Dec. 1, 2020 (8 pages).

\* cited by examiner

HONEYCOMB FILTER

The present application is an application based on JP 2017-095956 filed on May 12, 2017 with Japan Patent Office, the entire contents of which are incorporated herein by reference.

BACKGROUND OF THE INVENTION

Field of the Invention

The present invention relates to a honeycomb filter, and more particularly, it relates to a honeycomb filter which is capable of effectively inhibiting leakage of particulate matter such as soot and inhibiting rise of pressure loss.

Description of the Related Art

In various industries, internal combustion engines are used as power sources. On the other hand, exhaust gases emitted from the internal combustion engines during combustion of fuel include particulate matter such as soot or ash. For example, regulations on removal of the particulate matter to be emitted from a diesel engine have become stricter worldwide, and as a filter to remove the particulate matter, a honeycomb filter having a honeycomb structure is used. Hereinafter, the particulate matter will occasionally be referred to as "PM". The PM is an abbreviation for "the particulate matter".

Heretofore, as the honeycomb filter to remove the PM, there has been suggested a honeycomb filter including a honeycomb structure body having porous partition walls arranged to surround a plurality of cells, and a plugging portion to plug either one of end portions of each of the cells.

Such a honeycomb filter has a structure in which the porous partition walls perform a function of a filter which removes the PM. Specifically, when an exhaust gas containing the PM flows into an inflow end face of the honeycomb filter, the PM is trapped by the porous partition walls to filter the exhaust gas, and then the purified exhaust gas is emitted from an outflow end face of the honeycomb filter. In this way, the PM in the exhaust gas can be removed.

In recent years, as this honeycomb filter, there has been suggested a honeycomb filter including cells of parts of a plurality of cells, as through-cells in which any plugging portions are not arranged (e.g., see Patent Documents 1 to 3).

For example, in Patent Document 1, a honeycomb structure is disclosed in which inlet plugged cells plugged with plugging portions on the side of an inflow end face and through-cells opened at both ends are alternately and adjacently arranged.

In Patent Document 2, there is disclosed a honeycomb structure having plugged cells in which plugging portions are arranged in end portions on an inflow end face side, and through-cells in which any plugging portions are not arranged. In the honeycomb structure disclosed in Patent Document 2, among cells each of which is adjacent to the through-cell via a partition wall, the number of the plugged cells is 2 or less.

In Patent Document 3, there is disclosed a ceramics filter including plugged cells which are plugged only in one end face and through-cells which are not plugged in both end faces. In the ceramics filter disclosed in Patent Document 3, a central portion of a honeycomb structure body has a constitution including the plugged cells and the through-cells.

Furthermore, as a honeycomb filter, there has also been suggested a technology of circularly forming regions corresponding to corner portions in a quadrangular shape or more polygonal shape that is a sectional shape of each outflow cell (e.g., see Patent Document 4). In the honeycomb filter described in Patent Document 4, it is explained that the above constitution is employed, thereby increasing a heat capacity of the honeycomb filter, and it is possible to decrease temperature rise during regeneration.

[Patent Document 1] WO 2012/046484
[Patent Document 2] JP-A-2012-184660
[Patent Document 3] JP-A-2012-210581
[Patent Document 4] JP-A-2010-221159

SUMMARY OF THE INVENTION

In a honeycomb structure having such through-cells as disclosed in Patent Documents 1 to 3, there is also the problem that soot deposited originally in corner portions of the through-cells and eventually in the through-cells is accumulated in large amounts. For example, when the through-cells have a polygonal sectional shape, the soot is easily deposited in the corner portions of the through-cells. On the other hand, however, the soot deposited in the corner portions is hard to be removed during regeneration of the filter. Consequently, as a result, there is also the problem that the soot deposited originally in the corner portions of the through-cells and eventually in the through-cells is accumulated in large amounts.

Furthermore, in a honeycomb structure having plugging portions in inlet plugged cells and the like, when a sectional shape of the cells is polygonal, there is also the problem that the plugging portions arranged in the corner portions of the cells are damaged and soot leakage occurs from the corner portions of the cells in which the plugging portions are arranged.

In such a honeycomb filter as described in Patent Document 4, only regions corresponding to corner portions of outflow cells are formed in a circular shape, and hence, there is the problem that cracks and the like are easily generated between inflow cells.

The present invention has been developed in view of such problems of conventional technologies. According to the present invention, there is provided a honeycomb filter which is capable of effectively inhibiting leakage of particulate matter such as soot and inhibiting rise of pressure loss. In particular, there is provided the honeycomb filter in which plugging portions arranged in end portions of inflow cells and outflow cells are hardly damaged and which is capable of effectively inhibiting leakage of soot from the inflow cells and the outflow cells.

According to the present invention, there is provided a honeycomb filter as follows.

According to a first aspect of the present invention, a honeycomb filter is provided including:

a honeycomb structure body having porous partition walls arranged to surround a plurality of cells extending from an inflow end face to an outflow end face to form through channels for a fluid, and a plugging portion disposed to plug either one of end portions of each of cells of parts of the plurality of cells on the side of the inflow end face or the side of the outflow end face, wherein among the plurality of cells, cells in which the plugging portions are arranged in end portions on the outflow end face side and which are opened on the inflow end face side are defined as inflow cells, cells in which the plugging portions are arranged in end portions on the inflow end face side and which are opened on the outflow end face side are defined as outflow cells, cells in which the plugging portions are not arranged and which are opened on both of the inflow end face side and the outflow end face side are defined as through-cells, the honeycomb structure body has a plurality of cell rows in which two or more cells are linearly arranged along one direction, in a cross section of the honeycomb structure body which is perpendicular to an extending direction of the cells, the plurality of cell rows include a first cell row and a second cell row, the first cell row is a cell row constituted of at least one of the inflow cell and the outflow cell, and the through-cell, the second cell row is a cell row which does not include the through-cells in the cells linearly arranged along the one direction, in the cross section perpendicular to the extending direction of the cells, each of the cells has a polygonal shape of which corner portions are formed in a curved shape of a curvature radius R, and a width P1 (mm) of the first cell row, a width P2 (mm) of the second cell row and the curvature radius R (μm) satisfy a relation of Equation (1) mentioned below:

$$0.45 \leq (R/1000)/((P1+P2)/2) \times 100 \leq 20. \quad \text{Equation (1):}$$

According to a second aspect of the present invention, the honeycomb filter according to the above first aspect is provided, wherein the width P1 (mm) of the first cell row and the width P2 (mm) of the second cell row satisfy a relation of Equation (2) mentioned below:

$$2 \leq 100-(P2/P1 \times 100) \leq 50. \quad \text{Equation (2):}$$

According to a third aspect of the present invention, the honeycomb filter according to the above first or second aspects is provided, wherein an average value of the width P1 of the first cell row and the width P2 of the second cell row is from 0.7 to 3.5 mm According to a fourth aspect of the present invention, the honeycomb filter according to any one of the above first to third aspects is provided, wherein the width P1 of the first cell row is from 0.7 to 4.0 mm According to a fifth aspect of the present invention, the honeycomb filter according to any one of the above first to fourth aspects is provided, wherein the width P2 of the second cell row is from 0.7 to 2.7 mm.

According to a sixth aspect of the present invention, the honeycomb filter according to any one of the above first to fifth aspects is provided, wherein in the cross section perpendicular to the extending direction of the cells, a ratio N2/N1 of the number N2 of the second cell rows to the number N1 of the first cell rows is from ¼ to 4.0.

According to a seventh aspect of the present invention, the honeycomb filter according to any one of the above first to sixth aspects is provided, wherein in the first cell row, the inflow cells and the through-cells are alternately arranged in a row extending direction.

According to an eighth aspect of the present invention, the honeycomb filter according to any one of the above first to seventh aspects is provided, wherein in the first cell row, the outflow cells and the through-cells are alternately arranged in a row extending direction.

According to a ninth aspect of the present invention, the honeycomb filter according to any one of the above first to eighth aspects is provided, wherein in the second cell row, the inflow cells and the outflow cells are alternately arranged in a row extending direction.

According to a tenth aspect of the present invention, the honeycomb filter according to any one of the above first to ninth aspects is provided, wherein the second cell rows include a cell row in which only the inflow cells are linearly arranged along the one direction.

According to an eleventh aspect of the present invention, the honeycomb filter according to any one of the above first to tenth aspects is provided, wherein the second cell rows further include a cell row in which only the outflow cells are linearly arranged along the one direction.

According to a twelfth aspect of the present invention, the honeycomb filter according to any one of the above first to eleventh aspects is provided, comprising two or more regions having different constitutions of the cell row in the cross section perpendicular to the extending direction of the cells, wherein the honeycomb structure body is present in at least a part of the region.

According to a thirteenth aspect of the present invention, the honeycomb filter according to any one of the above first to eleventh aspects is provided, comprising a plurality of honeycomb structure bodies, wherein each of the honeycomb structure bodies is constituted of a pillar-shaped honeycomb segment, and side surfaces of a plurality of honeycomb segments are bonded to one another by a bonding layer.

In a honeycomb filter of the present invention, cell rows in which two or more cells are linearly arranged along one direction include a first cell row and a second cell row as follows. The first cell row is a cell row constituted of at least one of an inflow cell and an outflow cell, and a through-cell. The second cell row is a cell row which does not include the through-cells in the cells linearly arranged along the one direction. Furthermore, the honeycomb filter of the present invention has a constitution where each of the cells has a polygonal shape of which corner portions are formed in a curved shape of a curvature radius R. Additionally, the honeycomb filter is constituted to satisfy Equation (1) mentioned above, and hence, it is possible to effectively inhibit leakage of soot from the inflow cells and the outflow cells and to inhibit rise of pressure loss. Specifically, the honeycomb filter is constituted to satisfy Equation (1) mentioned above, so that in the inflow cells and the outflow cells, plugging portions arranged in end portions of the cells are hardly damaged. Consequently, it is possible to effectively inhibit the leakage of the soot from the inflow cells and the outflow cells. Furthermore, it is also possible to effectively inhibit the rise of the pressure loss.

DESCRIPTION OF THE PREFERRED EMBODIMENTS

(1) Honeycomb Filter (First Embodiment)

Figure 1:
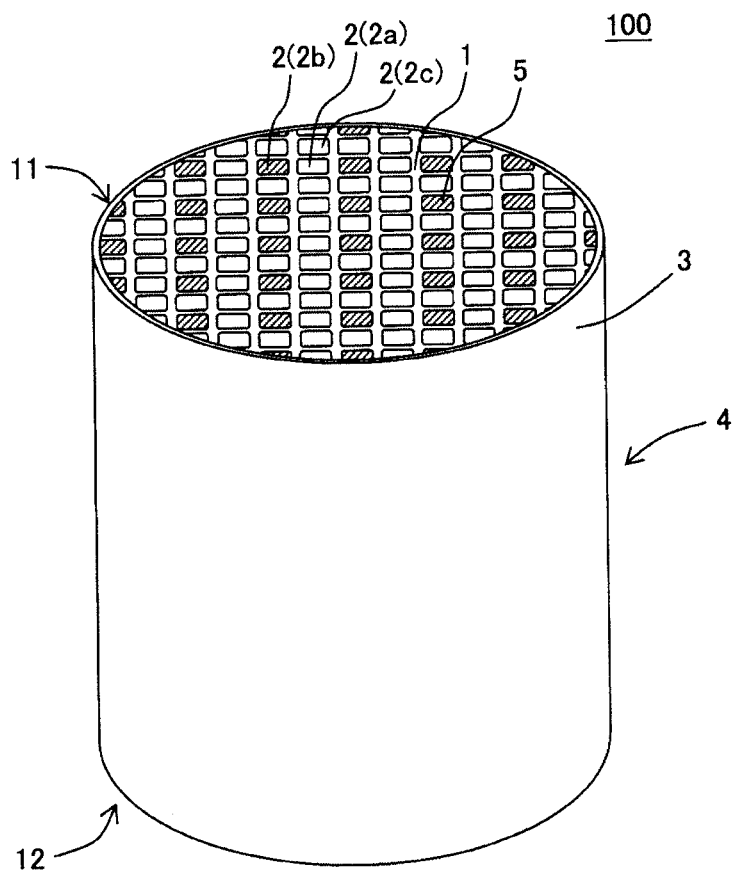
FIG. 1 is a perspective view schematically showing a first embodiment of a honeycomb filter of the present invention and seen from the side of an inflow end face.
Figure 2:
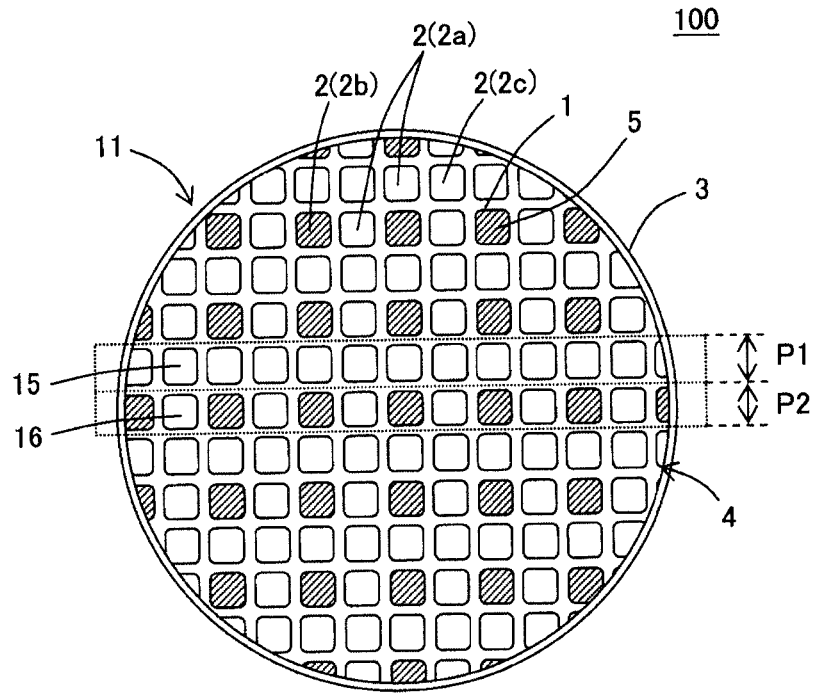
FIG. 2 is a plan view schematically showing the inflow end face of the honeycomb filter shown in FIG. 1.
Figure 3:
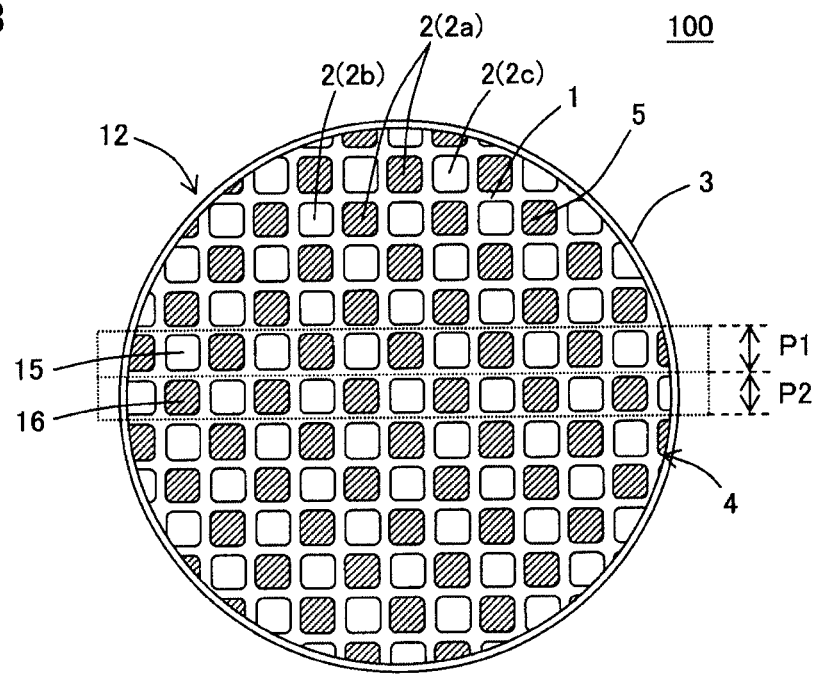
FIG. 3 is a plan view schematically showing an outflow end face of the honeycomb filter shown in FIG. 1.
Figure 4:
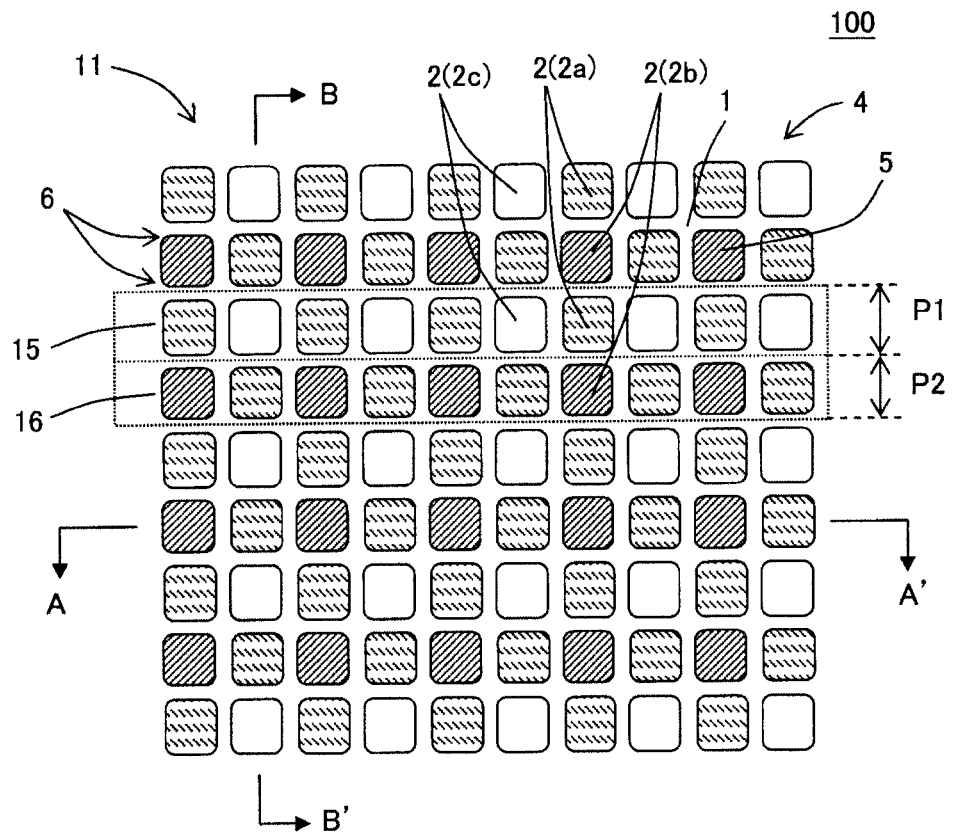
FIG. 4 is an enlarged plan view of an enlarged part of the inflow end face of the honeycomb filter shown in FIG. 2.
Figure 5:
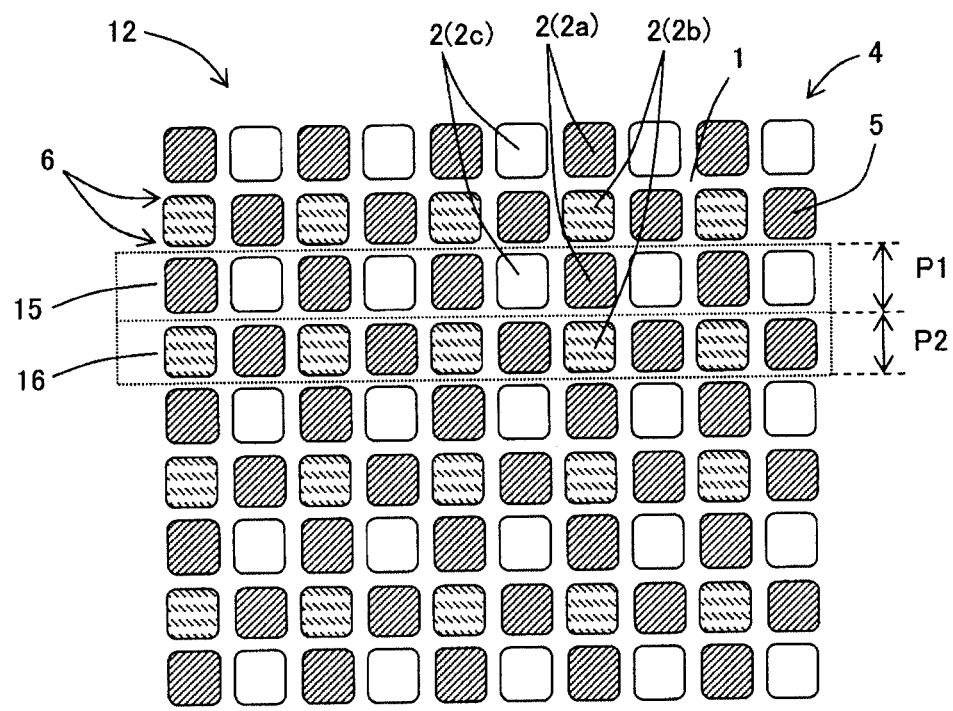
FIG. 5 is an enlarged plan view of an enlarged part of the outflow end face of the honeycomb filter shown in FIG. 3.
Figure 6:
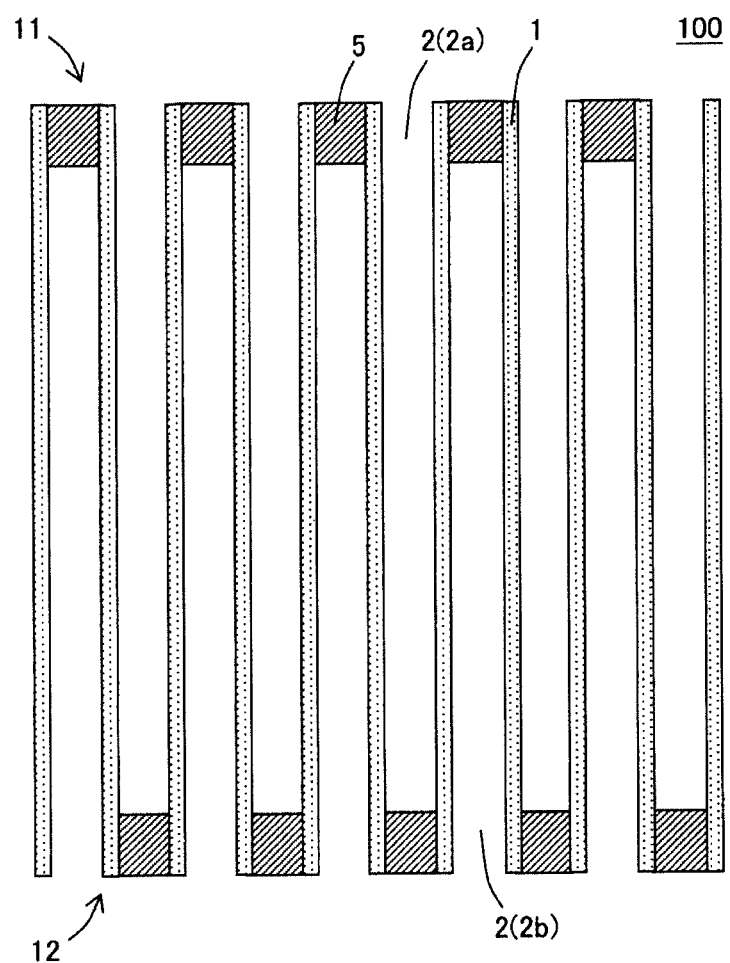
FIG. 6 is a cross-sectional view schematically showing a cross section taken along the A-A' line of FIG. 4.
Figure 7:
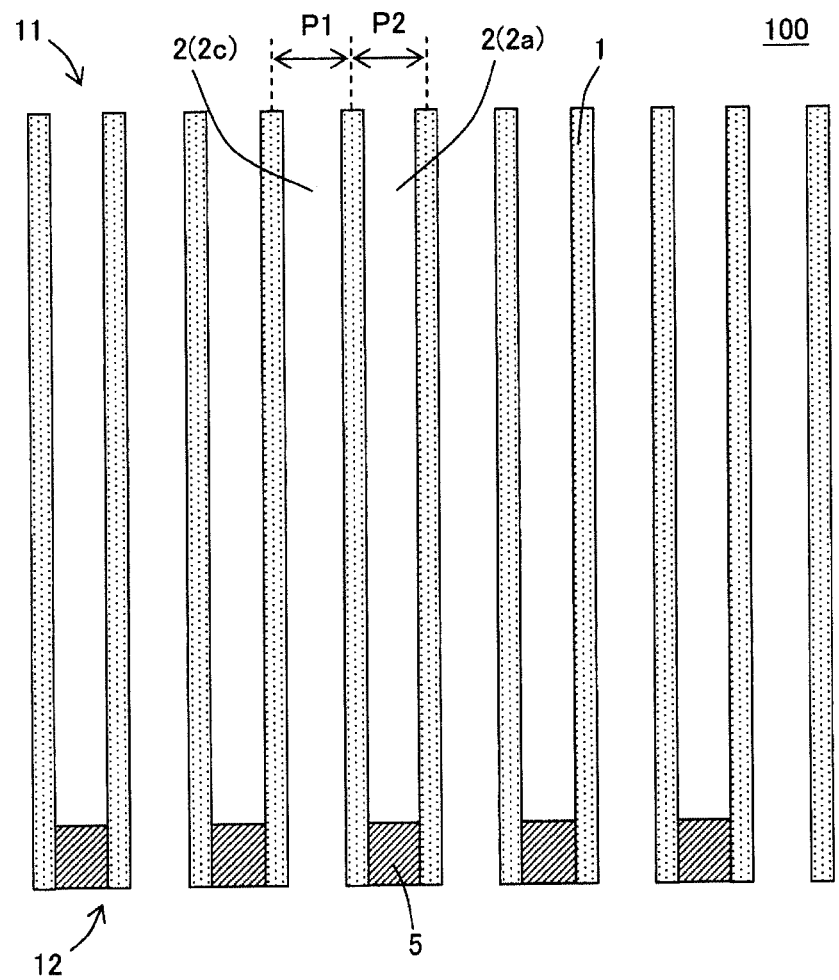
FIG. 7 is a cross-sectional view schematically showing a cross section taken along the B-B' line of FIG. 4.

As shown in FIG. 1 to FIG. 7, a first embodiment of a honeycomb filter of the present invention is a honeycomb filter 100 including a honeycomb structure body 4 having porous partition walls 1, and a plugging portion 5 disposed in either one of end portions of each of cells 2 formed in the honeycomb structure body 4. Here, FIG. 1 is a perspective view schematically showing a first embodiment of the honeycomb filter of the present invention and seen from the side of an inflow end face. FIG. 2 is a plan view schematically showing the inflow end face of the honeycomb filter shown in FIG. 1. FIG. 3 is a plan view schematically showing an outflow end face of the honeycomb filter shown in FIG. 1. FIG. 4 is an enlarged plan view of an enlarged part of the inflow end face of the honeycomb filter shown in FIG. 2. FIG. 5 is an enlarged plan view of an enlarged part of the outflow end face of the honeycomb filter shown in FIG. 3. FIG. 6 is a cross-sectional view schematically showing a cross section taken along the A-A' line of FIG. 4. FIG. 7 is a cross-sectional view schematically showing a cross section taken along the B-B' line of FIG. 4.

The partition walls 1 of the honeycomb structure body 4 are arranged to surround a plurality of cells 2 of the pillar-shaped honeycomb structure body 4 which extend from an inflow end face 11 to an outflow end face 12 to form through channels for a fluid. That is, the honeycomb structure body 4 possesses a honeycomb structure in which the plurality of cells 2 are defined by the porous partition walls 1.

The plugging portion 5 is disposed to plug either one of the end portions of each of the cells 2, in the cells 2 of parts of the plurality of cells 2 formed in the honeycomb structure body 4. That is, the cells 2 of the parts of the plurality of cells 2 are the cells 2 in which either one of the end portions of each cell is plugged with the plugging portion 5, and the residual cells 2 other than the cells 2 of the parts are the cells 2 in which the plugging portions 5 are not arranged in the end portions on both sides and which are opened in the end portions on both the sides. Hereinafter, the plurality of cells 2 will be referred to as inflow cells 2a, outflow cells 2b or through-cells 2c in accordance with regions where the plugging portions 5 are to be arranged or presence/absence of the arrangement of the plugging portions 5. The inflow cell 2a is the cell 2 in which the plugging portion 5 is disposed in the end portion on the side of the outflow end face 12 and which is opened on the side of the inflow end face 11. The outflow cell 2b is the cell 2 in which the plugging portion is disposed in the end portion on the inflow end face 11 side and which is opened on the outflow end face 12 side. The through-cell 2c is the cell 2 in which the plugging portions 5 are not arranged in the both end portions and which is opened on both of the inflow end face 11 side and the outflow end face 12 side.

FIG. 4 and FIG. 5 show the through-cells 2c as outlined cells. FIG. 4 shows that the plugging portions 5 are arranged in the end portions of the outflow cells 2b on the inflow end face 11 side. The plugging portion 5 is shown by hatching of lines slanted upward to the right. In FIG. 4, the inflow cell 2a is shown by hatching of broken lines slanted downward to the right. It is to be noted that in the inflow cells 2a, the plugging portions 5 are not arranged in the end portions on the inflow end face 11 side, and on the inflow end face 11 side shown in FIG. 4, the end portions of the inflow cells 2a are opened in the same manner as in the through-cells 2c. However, when FIG. 4 shows the inflow cells 2a as the outlined cells, there is the fear that it is difficult to distinguish between the through-cell 2c and the inflow cell 2a on a paper surface of FIG. 4. Consequently, in FIG. 4 and FIG. 5, the cells 2 in which the plugging portions 5 are not arranged in the end portions on an end face side shown in the drawing and the plugging portions are arranged in end portions on an opposite side in the extending direction of the cells are shown by hatchings of broken lines slanted downward to the right. Furthermore, also in FIG. 8 to FIG. 19 and FIG. 24 to FIG. 35 each showing the end face of the honeycomb filter as described later, cells in which plugging portions are not arranged in end portions on an end face side shown in each drawing and the plugging portions are arranged in end portions on an opposite side in an extending direction of the cells are shown by hatchings of broken lines slanted downward to the right.

The honeycomb structure body 4 has a plurality of cell rows in which two or more cells 2 are linearly arranged along one direction, in a cross section of the honeycomb structure body 4 which is perpendicular to the extending direction of the cells 2. Then, the plurality of cell rows include a first cell row 15 and a second cell row 16 as described below. The first cell row 15 is a cell row constituted of at least one of the inflow cell 2a and the outflow cell 2b, and the through-cell 2c. The second cell row 16 is a cell row which does not include the through-cells 2c in the cells 2 linearly arranged along the one direction. It is to be noted that the second cell row 16 may be a cell row constituted only of the inflow cells 2a or only of the outflow cells 2b, or a cell row in which the outflow cells 2b and the inflow cells 2a are mixed.

According to the honeycomb filter 100 of the present embodiment, in the cross section perpendicular to the extending direction of the cells 2, each of the cells 2 has a polygonal shape of which corner portions are formed in a curved shape of a curvature radius R (μm). In FIG. 4 and FIG. 5, reference numeral 6 indicates the corner portions 6 formed in the curved shape in the shape of the cell 2 in the cross section perpendicular to the extending direction of the cells 2. Furthermore, a width P1 (mm) of the first cell row 15, a width P2 (mm) of the second cell row 16 and the curvature radius R (μm) satisfy a relation of Equation (1) mentioned below. In Equation (1) mentioned below, R indicates the curvature radius R (unit: μm) of a curved region in each of the corner portions 6 of the cells 2.

$$0.4 \leq (R/1000)/((P1+P2)/2) \times 100 \leq 20 \qquad \text{Equation (1):}$$

According to this constitution, in the inflow cells 2a and the outflow cells 2b, the plugging portions 5 arranged in the end portions of the cells 2 are hardly damaged. Consequently, it is possible to effectively inhibit leakage of soot from the inflow cells 2a and the outflow cells 2b and to inhibit rise of pressure loss. Furthermore, the honeycomb filter 100 is constituted to satisfy Equation (1) mentioned above, and hence, a high regeneration efficiency is achievable in a filter regenerating operation of burning and removing the soot deposited in the cells 2.

In Equation (1), when a value of "$(R/1000)/((P1+P2)/2) \times 100$" is less than 0.4, the soot and the like easily leak out from the honeycomb filter. Furthermore, sufficient improvement of the regeneration efficiency is not seen in the filter regenerating operation of burning and removing the soot deposited in the cells 2. In Equation (1), when the value of "$(R/1000)/((P1+P2)/2) \times 100$" is in excess of 20, the pressure loss noticeably increases. In Equation (1), the value of "$(R/1000)/((P1+P2)/2) \times 100$" is especially preferably 1 or more. Furthermore, the value is especially preferably 15 or less.

In each of the cells 2, the curvature radius R of each of the corner portions 6 formed in the curved shape can be measured as follows. Initially, the inflow end face 11 and the outflow end face 12 of the honeycomb filter 100 are imaged with an image measuring instrument. Then, images of the imaged inflow end face 11 and outflow end face 12 are analyzed, thereby obtaining the curvature radius R of the corner portion 6. In a method of the image analysis, for example, "VM-2520 (tradename)" manufactured by Nikon Corporation is usable. The curvature radius R of the corner portion 6 of the cell 2 is obtainable by obtaining a radius (or a diameter) of an inscribed circle of the corner portions 6 in curve fitting to the corner portions 6 of the cell 2 by the above image analysis.

In the honeycomb filter 100 of the present embodiment, a cell row directing direction, i.e., the above-mentioned one direction may be an optional direction in the cross section of the honeycomb structure body 4 which is perpendicular to the extending direction of the cells 2, as long as two or more cells 2 are linearly arranged in the direction. However, when the width P1 of the first cell row 15 is compared with the width P2 of the second cell row 16, the respective cell rows are parallel cell rows extending in the same direction.

In the cross section of the honeycomb structure body 4 which is perpendicular to the extending direction of the cells 2, at least one row may be present as the first cell row 15. Furthermore, in the cross section of the honeycomb structure body 4 which is perpendicular to the extending direction of the cells 2, at least one row may be present as the second cell row 16.

In the honeycomb filter 100 of the present embodiment, it is preferable that the width P1 of the first cell row 15 and the width P2 of the second cell row 16 satisfy a relation of Equation (2) mentioned below. In Equation (2) mentioned below, P1 indicates the width P1 (unit: mm) of the first cell row 15, and P2 indicates the width P2 (unit: mm) of the second cell row 16. In the honeycomb structure body 4 shown in FIG. 4 and FIG. 5, a side edge in measuring the width of each cell row is an intermediate position of a thickness of the partition wall 1 disposed at the side edge of each cell row. In this way, the side edges on both sides of each cell row are obtained, and a distance between two side edges is measured. The measured distance between the two side edges is considered as the width of each of the cell rows.

$$2 \leq 100-(P2/P1 \times 100) \leq 50 \quad \text{Equation (2):}$$

The honeycomb filter is constituted to satisfy Equation (2), the width P1 of the first cell row 15 including the through-cells 2c is therefore relatively larger than the width P2 of the second cell row 16, and it is possible to further decrease the pressure loss of the honeycomb filter 100.

In Equation (2), when a value of "$100-(P2/P1 \times 100)$" is less than 2, the width P1 of the first cell row 15 including the through-cells 2c is about the same as the width P2 of the second cell row 16, and the decrease of the pressure loss might be excessively small. In Equation (2), when the value of "$100-(P2/P1 \times 100)$" is in excess of 50, the width P1 of the first cell row 15 is excessively large, and hence, a trapping efficiency might decrease. In Equation (2), the value of "$100-(P2/P1 \times 100)$" is especially preferably 5 or more. Furthermore, the value is especially preferably 45 or less.

An average value of the width P1 of the first cell row 15 and the width P2 of the second cell row 16 is preferably from 0.7 to 3.5 mm and further preferably from 1.0 to 2.5 mm. When the above average value is less than 0.7 mm, clogging of the cells 2 due to the depositing of the soot unfavorably occurs. Furthermore, when the above average value is in excess of 3.5 mm, the substantial number of the cells 2 decreases, thereby increasing an amount of the soot to be deposited per cell 2, and the rise of the pressure loss is unfavorably caused.

The width P1 of the first cell row 15 is preferably from 0.7 to 4.0 mm and further preferably from 1.0 to 3.0 mm. When the width P1 of the first cell row 15 is less than 0.7 mm, the clogging of the cells 2 due to the depositing of the soot unfavorably occurs. Furthermore, when the width P1 of the first cell row 15 is in excess of 4.0 mm, the substantial number of the cells 2 decreases, thereby increasing the amount of the soot to be deposited per cell 2, and the rise of the pressure loss is unfavorably caused.

The width P2 of the second cell row 16 is preferably from 0.7 to 2.7 mm and further preferably from 1.0 to 2.0 mm. When the width P2 of the second cell row 16 is less than 0.7 mm, the clogging of the cells 2 due to the depositing of the soot unfavorably occurs. Furthermore, when the width P2 of the second cell row 16 is in excess of 2.7 mm, the substantial number of the cells 2 decreases, thereby increasing the amount of the soot to be deposited per cell 2, and the rise of the pressure loss is unfavorably caused.

In each of the first cell row 15 and the second cell row 16, there are not any special restrictions on the number of the cells 2 to be linearly arranged. However, in each of the cell rows, it is preferable that five or more cells 2 are linearly arranged, and it is further preferable that ten or more cells 2 are linearly arranged. It is to be noted that an upper limit of the number of the cells 2 to be linearly arranged is the number of all the cells 2 that are linearly present from one peripheral edge to the other peripheral edge of the honeycomb structure body 4.

In the cross section perpendicular to the extending direction of the cells 2, each of a number N1 of the first cell rows 15 and a number N2 of the second cell rows 16 may be at least one. In the honeycomb filter 100 of the present embodiment, a ratio N2/N1 of the number N2 of the second cell rows 16 to the number N1 of the first cell rows 15 is preferably from 1/4 to 4.0 and further preferably from 1/3 to 3.0. According to such a constitution, it is possible to effectively inhibit the rise of the pressure loss while acquiring a large capacity for ash to be deposited. It is to be noted that when the above ratio N2/N1 is less than 1/4, the ratio of the number of the outflow cells 2b to the number of the inflow cells 2a decreases. Consequently, when a small amount of soot is deposited from the state where any soot is not deposited on the partition walls 1, the rise of the pressure loss of the honeycomb filter 100 might increase. Furthermore, when the above ratio N2/N1 is in excess of 4.0, the capacity for the ash to be deposited might decrease due to the decrease of the inflow cells 2a.

In the cross section perpendicular to the extending direction of the cells 2, the first cell row 15 is disposed adjacent to the second cell row 16 via the partition wall 1. For example, as in the honeycomb filter 100 shown in FIG. 1 to FIG. 7, the first cell rows 15 may be arranged on both sides of the second cell row 16, respectively, in the cross section perpendicular to the extending direction of the cells 2. In the honeycomb filter 100, the first cell rows 15 and the second cell rows 16 are alternately arranged in a direction perpendicular to the respective rows in the cross section perpendicular to the extending direction of the cells 2. In the honeycomb filter 100 having such a constitution, it is possible to comparatively uniformly acquire the capacity for the ash to be deposited in respective places of the above cross section.

In the first cell row 15, the inflow cells 2a and the through-cells 2c may be alternately arranged in a row extending direction. Furthermore, in the first cell row 15, the outflow cells 2b and the through-cells 2c may be alternately arranged in the row extending direction. It is to be noted that the first cell row 15 may be a cell row in which the inflow cells 2a, the outflow cells 2b and the through-cells 2c are mixed in the row extending direction, but it is preferable that the first cell row is a cell row constituted of the inflow cells 2a and the through-cells 2c or a cell row constituted of the outflow cells 2b and the through-cells 2c.

In the second cell row 16, the inflow cells 2a and the outflow cells 2b may be alternately arranged in the row extending direction. The second cell rows 16 may include a plurality of types of cell rows which are different in the arrangement of the inflow cells 2a and the outflow cells 2b, as long as the cell rows do not include the through-cells 2c. For example, in addition to the cell row constituted of the inflow cells 2a and the outflow cells 2b, the second cell rows 16 may further include a cell row in which only the inflow cells 2a are linearly arranged along one direction. Furthermore, the second cell rows may further include a cell row in which only the outflow cells 2b are linearly arranged along one direction.

There are not any special restrictions on an overall shape of the honeycomb filter 100. An example of the overall shape of the honeycomb filter 100 shown in FIG. 1 is a round pillar shape in which the inflow end face 11 and the outflow end face 12 are round. Although not shown in the drawing, another example of the overall shape of the honeycomb filter may be a pillar shape in which an inflow end face and an outflow end face have a substantially round shape such as an elliptic shape, a racetrack shape, or an oblong shape. Alternatively, the overall shape of the honeycomb filter may be a prismatic columnar shape in which an inflow end face and an outflow end face have a polygonal shape such as a quadrangular shape or a hexagonal shape.

A thickness of the partition walls 1 is preferably from 50 to 600 µm, further preferably from 100 to 500 µm, and especially preferably from 150 to 450 µm. When the thickness of the partition walls 1 is less than 50 μm, an isostatic strength of the honeycomb filter 100 might deteriorate. When the thickness of the partition walls 1 is in excess of 600 μm, the pressure loss might increase, and drop of an engine output or deterioration of a fuel efficiency might be caused. The thickness of the partition walls 1 is a value measured by a method of observing a cross section of the honeycomb filter 100 which is perpendicular to an axial direction with an optical microscope.

A porosity of the partition walls 1 is, for example, preferably from 20 to 90%, further preferably from 25 to 80%, and especially preferably from 30 to 75%. When the porosity of the partition walls 1 is less than 20%, the pressure loss of the honeycomb filter 100 might increase, and the drop of the engine output or the deterioration of the fuel efficiency might be caused. When the porosity of the partition walls 1 is 30% or more, the above problem is harder to occur. On the other hand, when the porosity of the partition walls 1 is in excess of 90%, the isostatic strength of the honeycomb filter 100 might deteriorate. When the porosity of the partition walls 1 is 75% or less, the above problem is harder to occur. It is to be noted that the porosity of the partition walls 1 is a value measured with a mercury porosimeter. An example of the mercury porosimeter is AutoPore 9500 (tradename) manufactured by Micromeritics Instrument Corp.

There are not any special restrictions on the original polygonal shape of the cells 2 as long as the corner portions of the polygonal shape are formed in the curved shape of the curvature radius R. As described later, examples of the shape of the cells 2 include a quadrangular shape, a hexagonal shape and an octagonal shape.

There are not any special restrictions on a material constituting the partition walls 1, but from the viewpoints of strength, heat resistance, durability and the like, it is preferable that a main component is any type of ceramics of an oxide or a non-oxide, a metal, or the like. Specifically, it is considered that examples of ceramics include cordierite, mullite, alumina, spinel, silicon carbide, silicon nitride, and aluminum titanate. It is considered that examples of the metal include a Fe—Cr—Al based metal and metal silicon. It is preferable to use at least one selected from the group consisting of these materials as the main component. From the viewpoints of a high strength, a high heat resistance and the like, it is especially preferable to use at least one selected from the group consisting of alumina, mullite, aluminum titanate, cordierite, silicon carbide and silicon nitride, as the main component. Furthermore, from the viewpoints of a high thermal conductivity, a high heat resistance and the like, silicon carbide or a silicon-silicon carbide composite material is especially suitable. Here, "the main component" means a component constituting 50 mass % or more of the partition walls. The above component is included in the material constituting the partition walls as much as preferably 70 mass % or more and further preferably 80 mass % or more.

It is preferable that a material of the plugging portions 5 is a material which is considered to be the preferable material of the partition walls 1. The material of the plugging portions 5 and the material of the partition walls 1 may be the same material or different materials.

In the honeycomb filter 100 of the present embodiment, an exhaust gas purifying catalyst may be loaded onto at least one of each of the surfaces of the partition walls 1 of the honeycomb structure body 4 and each of pores of the partition walls 1. According to this constitution, CO, $NO_x$, HC and the like in the exhaust gas can be changed to harmless substances by a catalytic reaction. Furthermore, oxidation of the soot trapped in the partition walls 1 can be promoted.

When the catalyst is loaded onto the honeycomb filter 100 of the present embodiment, it is preferable that the catalyst includes at least one selected from the group consisting of an SCR catalyst, a $NO_x$ absorber catalyst and an oxidation catalyst. The SCR catalyst is a catalyst to selectively reduce components to be purified. In particular, it is preferable that the SCR catalyst is a $NO_x$ selectively reducing SCR catalyst to selectively reduce $NO_x$ in the exhaust gas. Furthermore, an example of the SCR catalyst is a metal-substituted zeolite. Examples of a metal in the metal-substituted zeolite include iron (Fe) and copper (Cu). A suitable example of zeolite is a beta zeolite. Furthermore, the SCR catalyst may be a catalyst containing at least one selected from the group consisting of vanadium and titania, as a main component. Examples of the $NO_x$ absorber catalyst include an alkali metal and an alkali earth metal. Examples of the alkali metal include potassium, sodium, and lithium. An example of the alkali earth metal is calcium. An example of the oxidation catalyst is a catalyst containing a noble metal. Specifically, it is preferable that the oxidation catalyst contains at least one selected from the group consisting of platinum, vanadium and rhodium.

(2) Honeycomb Filter (Second Embodiment to Seventh Embodiment)

Next, description will be made as to a second embodiment to a seventh embodiment of the honeycomb filter of the present invention with reference to FIG. 8 to FIG. 19. Here, each of FIG. 8 to FIG. 19 is an enlarged plan view of an enlarged part of an inflow end face or an outflow end face, schematically showing the second embodiment to the seventh embodiment of the honeycomb filter of the present invention.

Honeycomb filters 200 and 300 of the second embodiment and the third embodiment shown in FIG. 8 to FIG. 11 have a constitution in which a shape of cells 2 satisfies Equation (1) mentioned above in the same manner as in the honeycomb filter 100 of the first embodiment (see FIG. 4 and the like). Specifically, each of the honeycomb filters 200 and 300 of the second embodiment and the third embodiment has a constitution where each of the cells 2 has a polygonal shape of which corner portions 6 are formed in a curved shape of a curvature radius R (μm). In the honeycomb filters 200 and 300 of the second embodiment and the third embodiment, arrangements of a first cell row 15 and a second cell row 16 are different from that in the honeycomb filter 100 of the first embodiment (see FIG. 4 and the like). Furthermore, it is preferable that the honeycomb filters of the embodiments have a constitution similar to the honeycomb filter 100 of the first embodiment (see FIG. 4 and the like) except for the arrangements of the first cell row 15 and the second cell row 16. It is to be noted that the honeycomb filters 200 and 300 of the second embodiment and the third embodiment have a constitution in which a width P1 of the first cell row 15 is larger than a width P2 of the second cell row 16.

Figure 8:
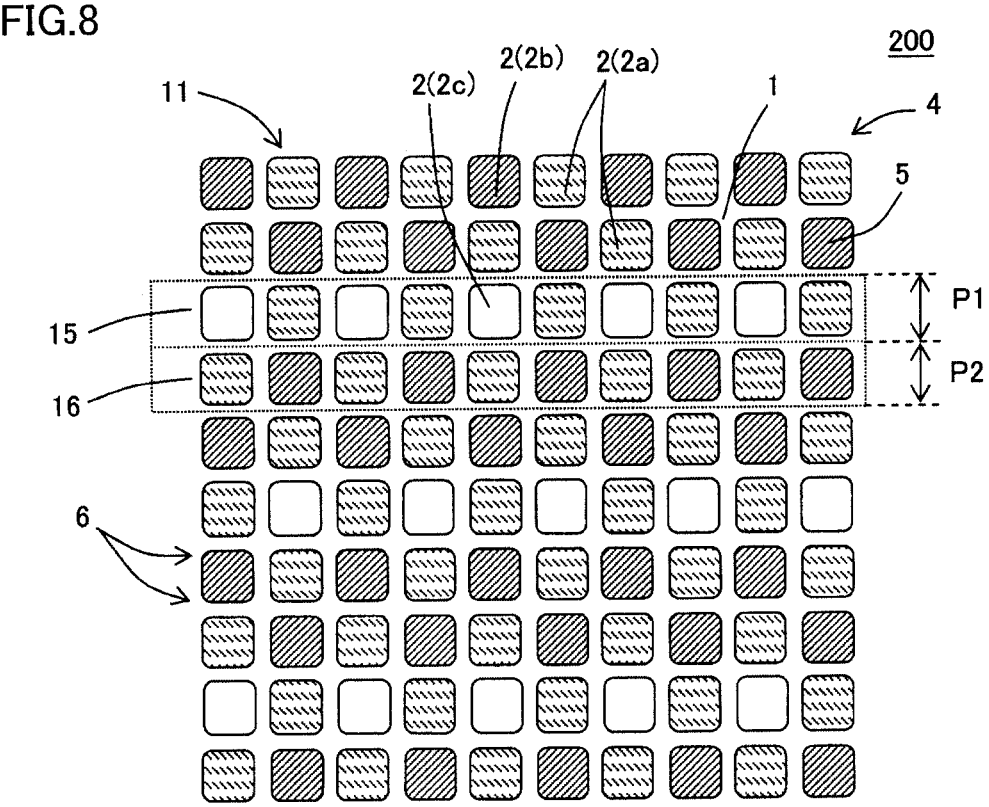
FIG. 8 is an enlarged plan view of an enlarged part of an inflow end face, schematically showing a second embodiment of the honeycomb filter of the present invention.
Figure 9:
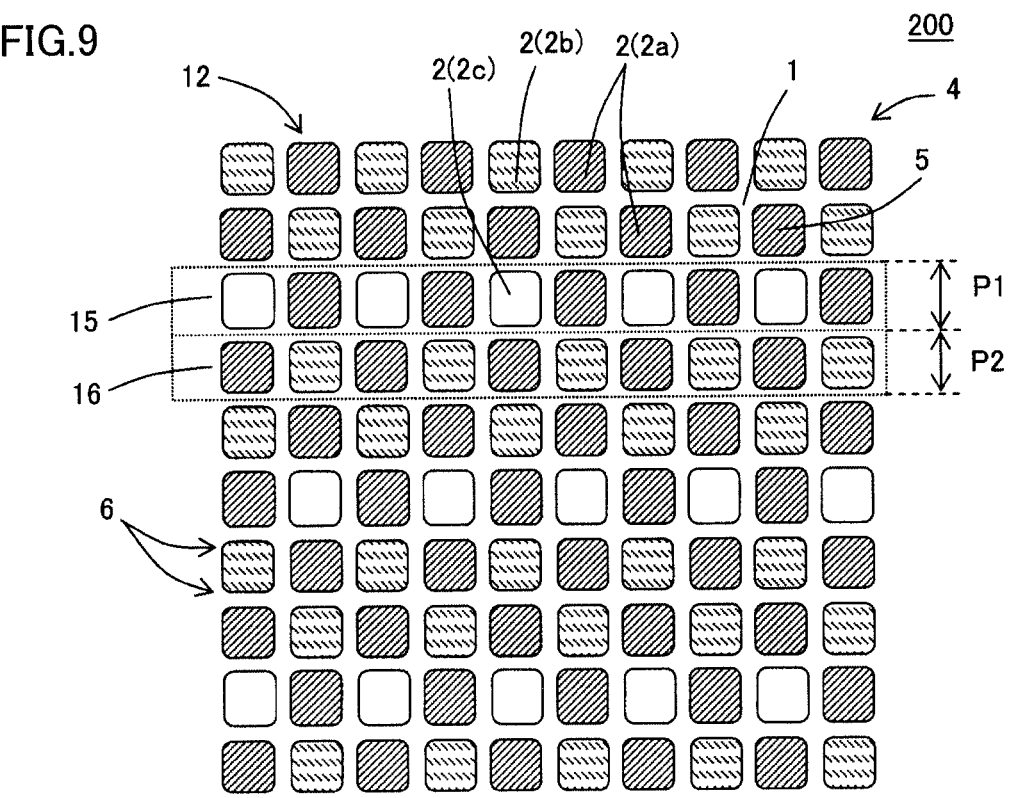
FIG. 9 is an enlarged plan view of an enlarged part of an outflow end face, schematically showing the second embodiment of the honeycomb filter of the present invention.

As shown in FIG. 8 and FIG. 9, in the honeycomb filter 200 of the second embodiment, the second cell row 16 is constituted of inflow cells 2a and outflow cells 2b, and two second cell rows are arranged continuously in a direction perpendicular to the second cell row 16. In this way, the first cell rows 15 and the second cell rows 16 do not have to be alternately arranged in a direction perpendicular to the respective rows. For example, the first cell rows 15 including through-cells 2c may relatively be decreased in accordance with a trapping efficiency required for the honeycomb filter 200. In the honeycomb filter 200 shown in FIG. 8 and FIG. 9, each of two second cell rows 16 adjacent to each other in the direction perpendicular to the second cell row 16 is a cell row in which the inflow cells 2a and the outflow cells 2b are alternately arranged. Then, in the two adjacent second cell rows 16, arrangement positions of plugging portions 5 are shifted as much as a half pitch.

Figure 10:
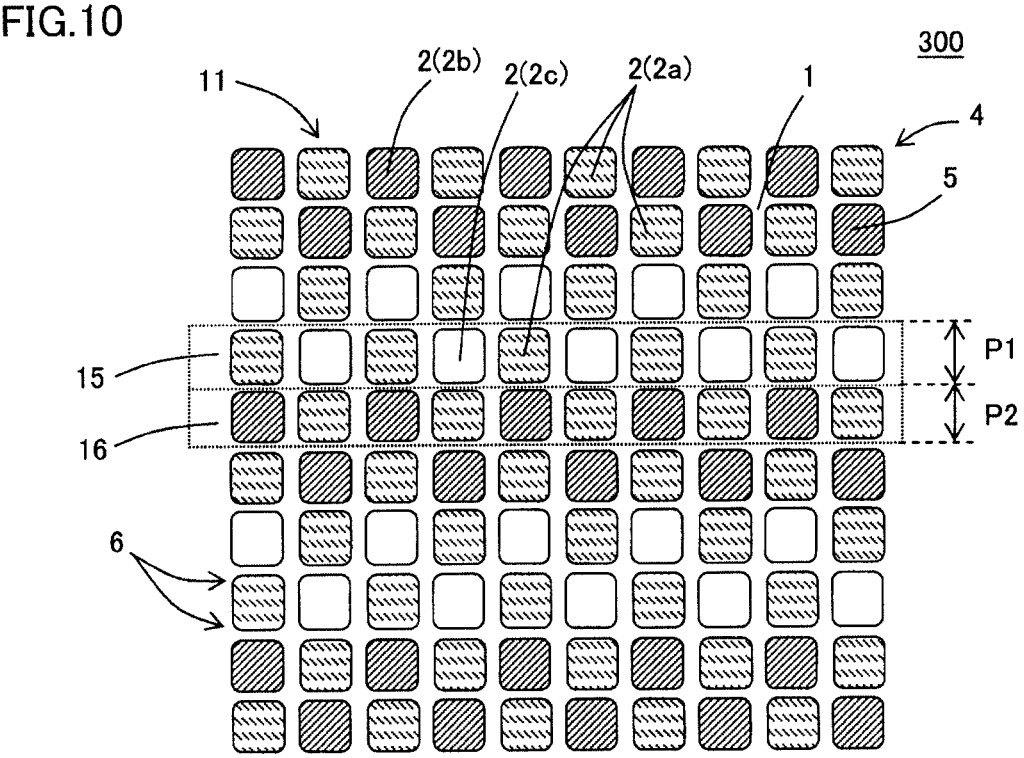
FIG. 10 is an enlarged plan view of an enlarged part of an inflow end face, schematically showing a third embodiment of the honeycomb filter of the present invention.
Figure 11:
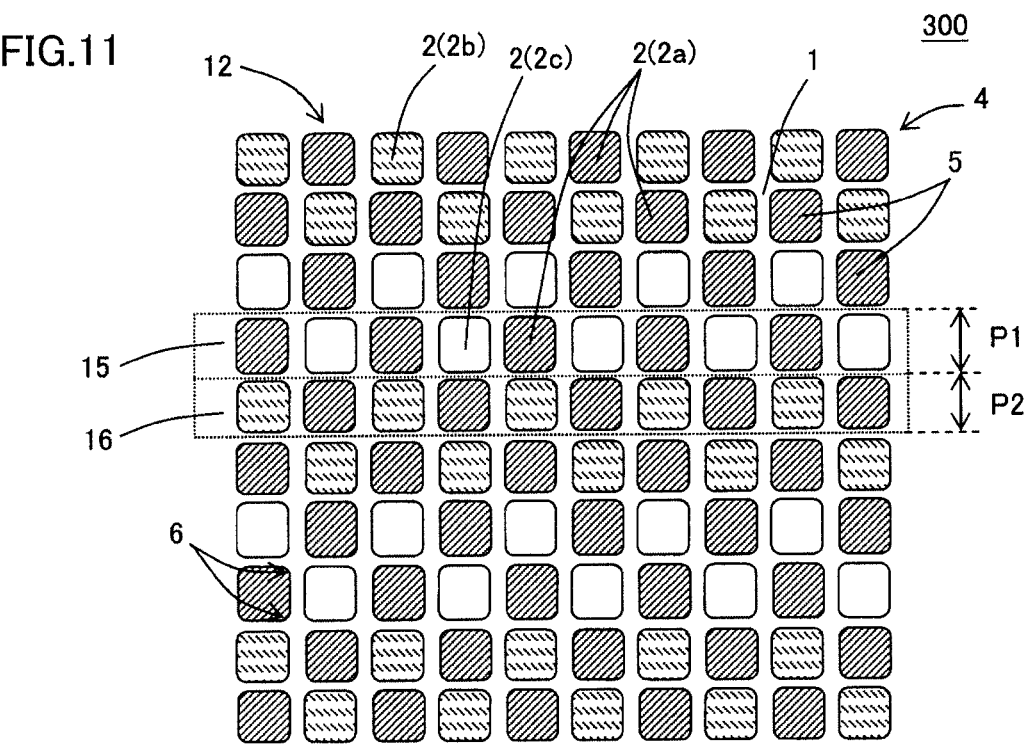
FIG. 11 is an enlarged plan view of an enlarged part of an outflow end face, schematically showing the third embodiment of the honeycomb filter of the present invention.

As shown in FIG. 10 and FIG. 11, in the honeycomb filter 300 of the third embodiment, the first cell row 15 is constituted of inflow cells 2a and through-cells 2c, and two first cell rows are continuously arranged in a direction perpendicular to the first cell row 15. In this way, the first cell rows 15 and the second cell rows 16 do not have to be alternately arranged in a direction perpendicular to the respective rows. Also in the honeycomb filter 200 having such a constitution, the honeycomb filter is constituted to satisfy Equation (1) mentioned above, so that it is possible to effectively inhibit leakage of soot. Furthermore, it is also possible to effectively inhibit rise of pressure loss.

It is to be noted that the honeycomb filter 300 of the third embodiment shown in FIG. 10 and FIG. 11 is a honeycomb filter of a segmented structure which will be described later. Consequently, a structure of the cells 2 shown in FIG. 10 and FIG. 11 shows a part of an end face of one honeycomb segment constituting the honeycomb filter of the segmented structure.

In honeycomb filters 400 and 500 of a fourth embodiment and a fifth embodiment shown in FIG. 12 to FIG. 15, cells 22 defined by partition walls 21 have a substantially quadrangular shape and a substantially octagonal shape. The substantially quadrangular shape is a shape in which corner portions of a quadrangular shape are formed in a curved shape, and the substantially octagonal shape is a shape in which corner portions of an octagonal shape are formed in a curved shape. Hereinafter, the substantially quadrangular shape in which the corner portions of the quadrangular shape are formed in the curved shape will occasionally be referred to as "the substantially quadrangular shape" or simply as "the quadrangular shape". Furthermore, the substantially octagonal shape in which the corner portions of the octagonal shape are formed in the curved shape will occasionally be referred to as "the substantially octagonal shape" or simply as "the octagonal shape". Each of the honeycomb filters 400 and 500 of the fourth embodiment and the fifth embodiment is constituted to satisfy Equation (1) mentioned above when a curved region in each of the corner portions of the cells 22 has a curvature radius R.

In the honeycomb filters 400 and 500 of the fourth embodiment and the fifth embodiment, quadrangular cells 22 and octagonal cells 22 are alternately formed in a cross section of a honeycomb structure body 24 which is perpendicular to an extending direction of the cells 22. It is preferable that each of the honeycomb filters 400 and 500 of the fourth embodiment and the fifth embodiment has a constitution similar to the honeycomb filter of the first embodiment (see FIG. 4 and the like), except for the shape of the cells 22 and arrangement of a first cell row 35 and a second cell row 36. It is preferable that each of the honeycomb filters 400 and 500 has a constitution in which a width P1 of the first cell row 35 is larger than a width P2 of the second cell row 36.

Figure 12:
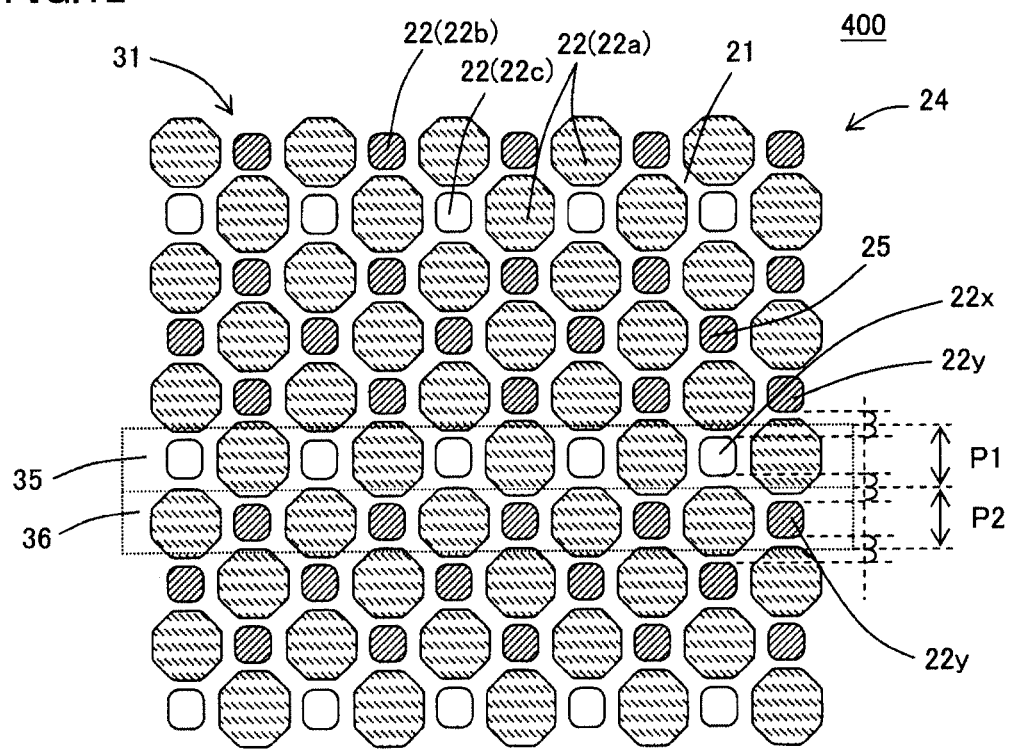
FIG. 12 is an enlarged plan view of an enlarged part of an inflow end face, schematically showing a fourth embodiment of the honeycomb filter of the present invention.
Figure 13:
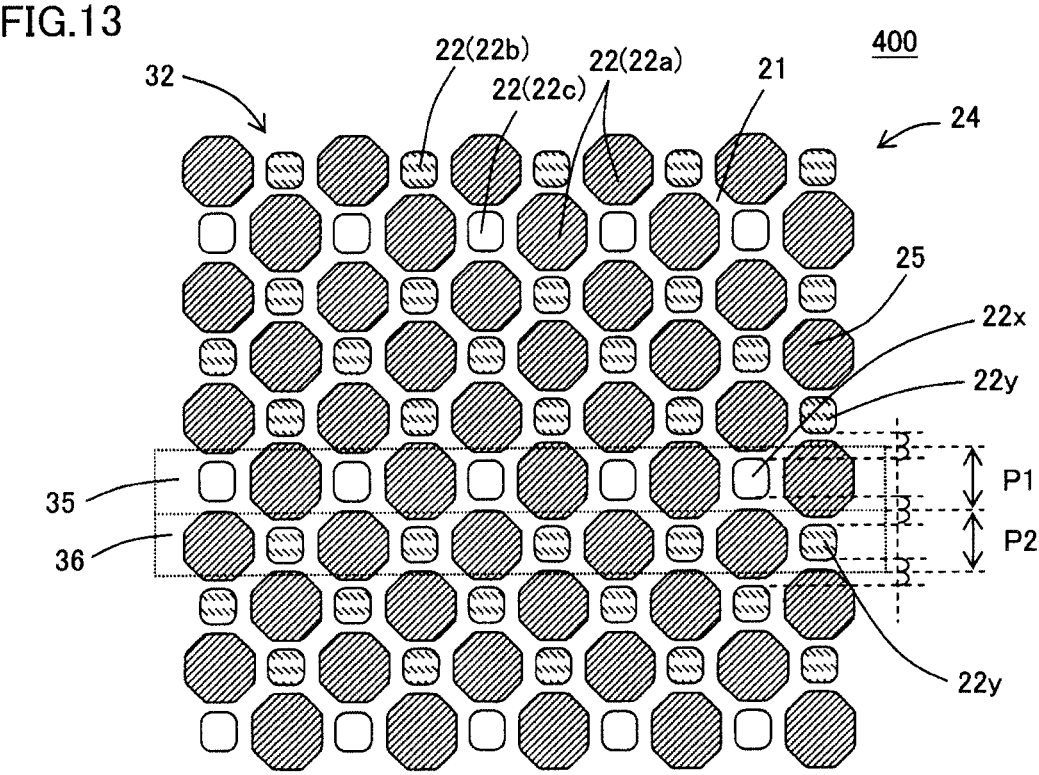
FIG. 13 is an enlarged plan view of an enlarged part of an outflow end face, schematically showing the fourth embodiment of the honeycomb filter of the present invention.

Here, description is made as to a method of measuring the width P1 of the first cell row 35 and the width P2 of the second cell row 36 in the honeycomb filters 400 and 500 of the fourth embodiment and the fifth embodiment shown in FIG. 12 to FIG. 15, with reference to FIG. 12 and FIG. 13. Initially, in the honeycomb filter 400 shown in FIG. 12 and FIG. 13, a cell row constituted of at least one of an inflow cell 22a and an outflow cell 22b, and a through-cell 22c is defined as the first cell row 35. The inflow cells 22a are cells 22 in which plugging portions 25 are arranged in end portions on an outflow end face 32 side and which are opened on an inflow end face 31 side. The outflow cells 22b are cells 22 in which the plugging portions 25 are arranged in end portions on the inflow end face 31 side and which are opened on the outflow end face 32 side. Furthermore, in cell rows in which the cells 22 are arranged along one direction, a cell row which does not include the through-cells 22c is defined as the second cell row 36. To measure the width of each cell row, initially, when the first cell row 35 denoted with reference numeral 35 is defined as "a measurement target cell row", a cell 22x disposed on an innermost side of the cell row is found from the cells 22 constituting the measurement target cell row. Next, as to the cell row disposed adjacent to this measurement target cell row, a cell 22y disposed on an innermost side of the cell row is found from the cells 22 constituting the adjacent cell row. Then, an intermediate position between the cell 22x and the cell 22y in a direction perpendicular to the extending direction of the cell rows is defined as a side edge of "the measurement target cell row" on one side. By the above-mentioned method, side edges on both sides of "the measurement target cell row" are obtained and a distance between the two side edges is measured. The measured distance between the two side edges is considered as a width of "the measurement target cell row".

The honeycomb filters 400 and 500 of the fourth embodiment and the fifth embodiment shown in FIG. 12 to FIG. 15 are honeycomb filters which are effective when an amount of soot in an exhaust gas is large and an amount of the soot to be deposited increases. In other words, these embodiments are suitable when it is more necessary to inhibit rise of pressure loss in a state where the soot is deposited than to inhibit rise of pressure loss when any soot is not deposited.

Figure 14:
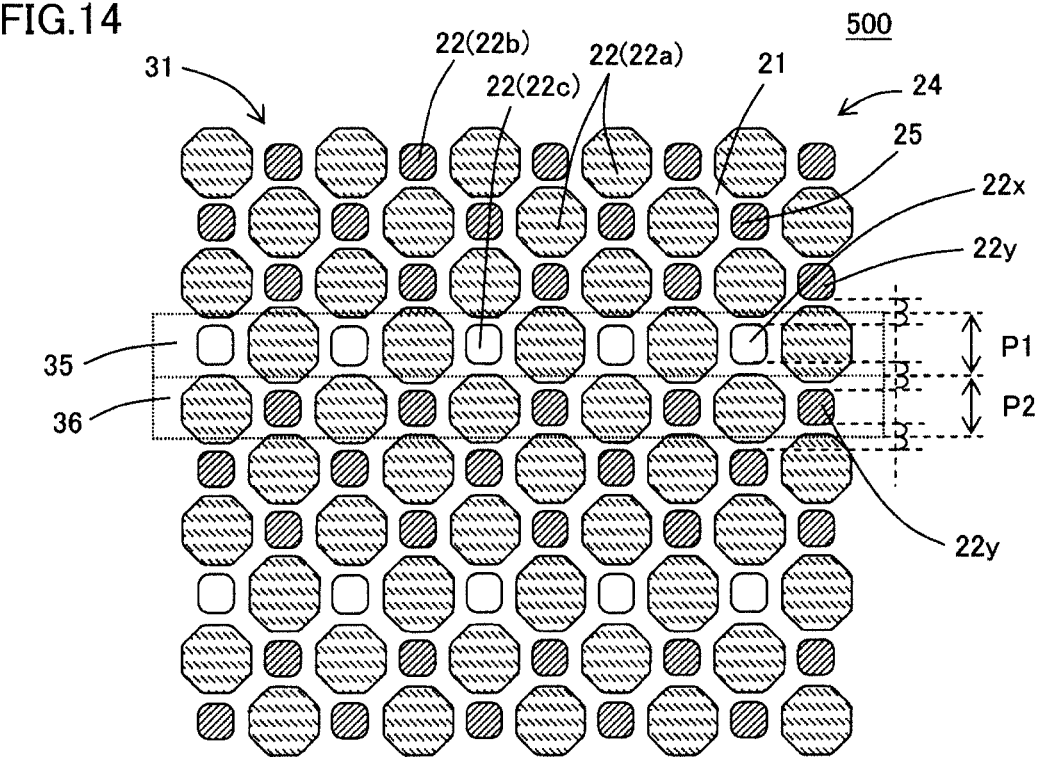
FIG. 14 is an enlarged plan view of an enlarged part of an inflow end face, schematically showing a fifth embodiment of the honeycomb filter of the present invention.
Figure 15:
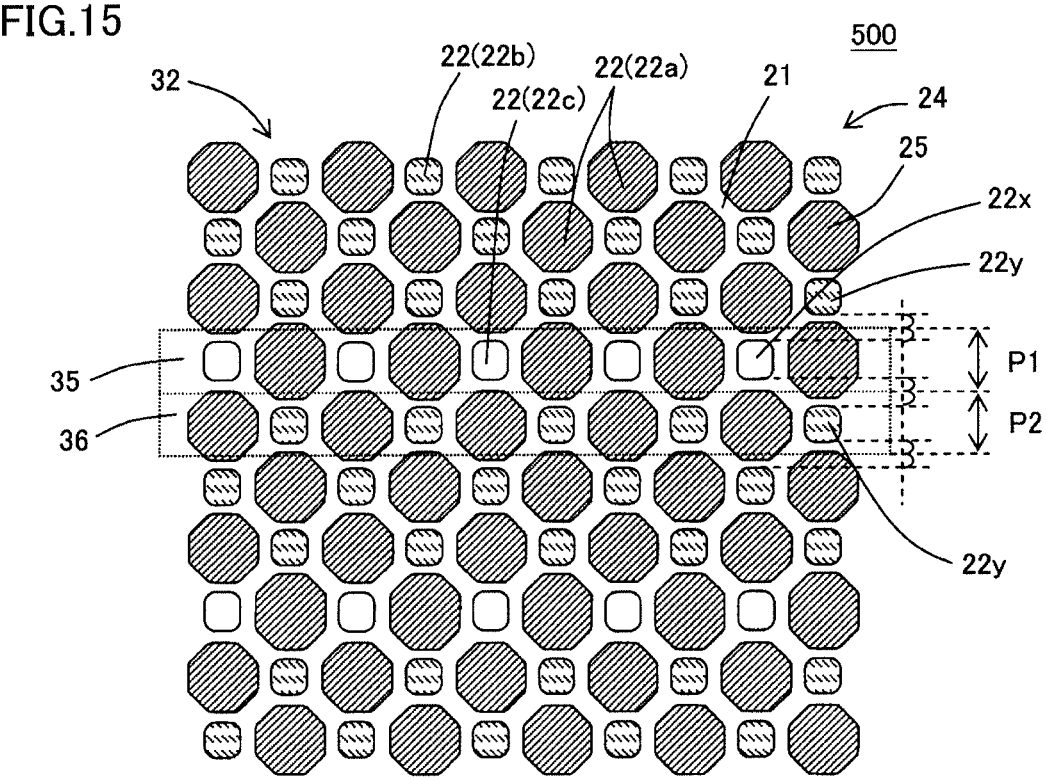
FIG. 15 is an enlarged plan view of an enlarged part of an outflow end face, schematically showing the fifth embodiment of the honeycomb filter of the present invention.

It is to be noted that the honeycomb filter 500 of the fifth embodiment shown in FIG. 14 and FIG. 15 is a honeycomb filter of a segmented structure which will be described later. Consequently, a structure of the cells 22 shown in FIG. 14 and FIG. 15 shows a part of an end face of one honeycomb segment constituting the honeycomb filter of the segmented structure.

In honeycomb filters 600 and 700 of a sixth embodiment and a seventh embodiment shown in FIG. 16 to FIG. 19, a shape of cells 42 defined by partition walls 41 is substantially hexagonal. The substantially hexagonal shape is a shape in which corner portions of a hexagonal shape are formed in a curved shape. Hereinafter, the substantially hexagonal shape in which the corner portions of the hexagonal shape are formed in the curved shape will occasionally be referred to as "the substantially hexagonal shape" or simply as "the hexagonal shape". Each of the honeycomb filters 600 and 700 of the sixth embodiment and the seventh embodiment is constituted to satisfy Equation (1) mentioned above when a curved region in each of the corner portions of the cells 42 has a curvature radius R. It is to be noted that FIG. 16 to FIG. 19 are schematic views to explain arrangements of the hexagonal cells 42 in the honeycomb filters 600 and 700 of the sixth embodiment and the seventh embodiment, and hence, the curved regions in the corner portions of the hexagonal cells 42 are omitted from the drawing.

FIG. 16 to FIG. 19 schematically show only the shape of the cells 42 defined by the partition walls 41. That is, FIG. 16 to FIG. 19 show the partition walls 41 by straight lines, and show a thickness of the partition walls 41 in an abstracted state. It is preferable that the honeycomb filters 600 and 700 of the sixth embodiment and the seventh embodiment have a constitution in which a width P1 of a first cell row 55 is larger than a width P2 of a second cell row 56 in a cross section of a honeycomb structure body 44 which is perpendicular to an extending direction of the cells 42.

In the honeycomb filters 600 and 700 of the sixth embodiment and the seventh embodiment shown in FIG. 16 to FIG. 19, during canning, uniformity of strength is achievable not only in longitudinal and lateral directions of each paper surface but also in a circumferential direction.

Description will be made as to a method of measuring the width P1 of the first cell row 55 and the width P2 of the second cell row 56 in the honeycomb filters 600 and 700 of the sixth embodiment and the seventh embodiment shown in FIG. 16 to FIG. 19, with reference to FIG. 16 and FIG. 17. Initially, in the honeycomb filter 600 shown in FIG. 16 and FIG. 17, a cell row constituted of at least one of an inflow cell 42a and an outflow cell 42b, and a through-cell 42c is defined as the first cell row 55. The inflow cells 42a are cells 42 in which plugging portions 45 are arranged in end portions on the side of an outflow end face 52 and which are opened on the side of an inflow end face 51. The outflow cells 42b are cells 42 in which the plugging portions 45 are arranged in end portions on the inflow end face 51 side and which are opened on the outflow end face 52 side. Furthermore, in cell rows in which the cells 42 are arranged along one direction, a cell row which does not include the through-cells 42c is defined as the second cell row 56. A side edge in measuring the width of each cell row is an intermediate position between an inwardly dented region and an outwardly projecting region in each of side edges of the respective cell rows. In this way, the side edges of each cell row on both sides are obtained and a distance between the two side edges is measured. The measured distance between the two side edges is considered as the width of the cell row.

In the hitherto described honeycomb filters of the first embodiment to the seventh embodiment, when the number of the inflow cells is compared with the number of the outflow cells, the number of the inflow cells is relatively large. For example, the honeycomb filters of the first embodiment to the seventh embodiment are honeycomb filters having a constitution in which parts of the outflow cells are changed to the through-cells in honeycomb filters having a constitution including predetermined repeating arrangements of the inflow cells and the outflow cells. On the other hand, in honeycomb filters of an eighth embodiment to a thirteenth embodiment mentioned below, when the number of inflow cells is compared with the number of outflow cells, the number of the outflow cells is relatively large. For example, the honeycomb filters of the eighth embodiment to the thirteenth embodiment are honeycomb filters having a constitution in which parts of the inflow cells are changed to through-cells in the honeycomb filters having the constitution including the predetermined repeating arrangements of the inflow cells and the outflow cells.

(3) Honeycomb Filters (Eighth Embodiment to Thirteenth Embodiment)

Next, description will be made as to the eighth embodiment to the thirteenth embodiment of the honeycomb filter of the present invention with reference to FIG. 24 to FIG. 35. Here, FIG. 24 to FIG. 35 are enlarged plan views of an enlarged part of an inflow end face or an outflow end face, schematically showing the eighth embodiments to the thirteenth embodiments of the honeycomb filter of the present invention.

In honeycomb filters 1100 and 1200 of the eighth embodiment and the ninth embodiment shown in FIG. 24 to FIG. 27, a shape of cells 2 is substantially quadrangular, and the filters are constituted to satisfy Equation (1) mentioned above in the same manner as in the honeycomb filter 100 of the first embodiment (see FIG. 4 and the like). In the honeycomb filter 1100 of the eighth embodiment, arrangement regions of inflow cells 2a and outflow cells 2b are reversed to those of the honeycomb filter 100 of the first embodiment (see FIG. 4 and the like). It is preferable that the honeycomb filter 1100 of the eighth embodiment has a constitution similar to the honeycomb filter 100 of the first embodiment (see FIG. 4 and the like), except for the above-mentioned arrangement regions. Furthermore, in the honeycomb filter 1200 of the ninth embodiment, arrangement regions of inflow cells 2a and outflow cells 2b are reversed to those of the honeycomb filter 200 of the second embodiment (see FIG. 8 and the like). It is preferable that the honeycomb filter 1200 of the ninth embodiment has a constitution similar to the honeycomb filter 200 of the second embodiment (see FIG. 8 and the like), except for the above-mentioned arrangement regions. It is preferable that the honeycomb filters 1100 and 1200 of the eighth embodiment and the ninth embodiment have a constitution in which a width P1 of a first cell row 15 is larger than a width P2 of a second cell row 16.

In honeycomb filters 1300 and 1400 of the tenth embodiment and the eleventh embodiment shown in FIG. 28 to FIG. 31, cells 22 defined by partition walls 21 have a substantially quadrangular shape and a substantially octagonal shape. In the honeycomb filter 1300 of the tenth embodiment, arrangement regions of inflow cells 22a and outflow cells 22b are reversed to those of the honeycomb filter 400 of the fourth embodiment (see FIG. 12 and the like). It is preferable that the honeycomb filter 1300 of the tenth embodiment has a constitution similar to the honeycomb filter 400 of the fourth embodiment (see FIG. 12 and the like), except for the above-mentioned arrangement regions. Furthermore, in the honeycomb filter 1400 of the eleventh embodiment, arrangement regions of inflow cells 22a and outflow cells 22b are reversed to those of the honeycomb filter 500 of the fifth embodiment (see FIG. 14 and the like). It is preferable that the honeycomb filter 1400 of the eleventh embodiment has a constitution similar to the honeycomb filter of the fifth embodiment, except for the above-mentioned arrangement regions.

In honeycomb filters 1500 and 1600 of the twelfth embodiment and the thirteenth embodiment shown in FIG. 32 to FIG. 35, cells 42 defined by partition walls 41 have a substantially hexagonal shape. In the honeycomb filter 1500 of the twelfth embodiment, arrangement regions of inflow cells 42a and outflow cells 42b are reversed to those of the honeycomb filter 600 of the sixth embodiment (see FIG. 16 and the like). It is preferable that the honeycomb filter 1500 of the twelfth embodiment has a constitution similar to the honeycomb filter 600 of the sixth embodiment (see FIG. 16 and the like), except for the above-mentioned arrangement regions. Furthermore, in the honeycomb filter 1600 of the thirteenth embodiment, arrangement regions of inflow cells 42a and outflow cells 42b are reversed to those of the honeycomb filter 700 of the seventh embodiment (see FIG.

18 and the like). It is preferable that the honeycomb filter 1600 of the thirteenth embodiment has a constitution similar to the honeycomb filter 700 of the seventh embodiment (see FIG. 18 and the like), except for the above-mentioned arrangement regions.

(4) Honeycomb Filters (Other Embodiments)

Figure 20:
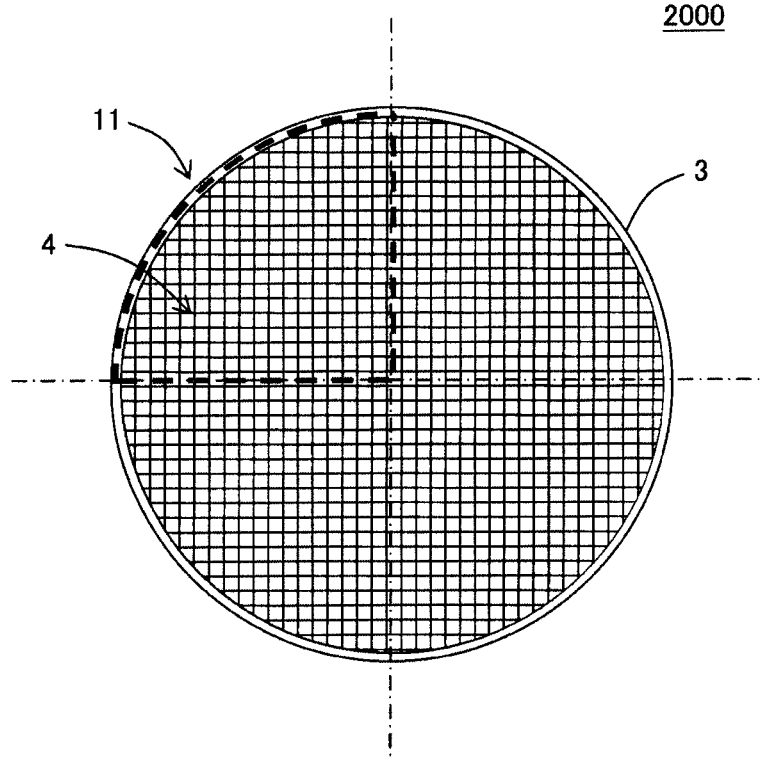
FIG. 20 is a plan view of an inflow end face, schematically showing another embodiment of the honeycomb filter of the present invention.
Figure 21:
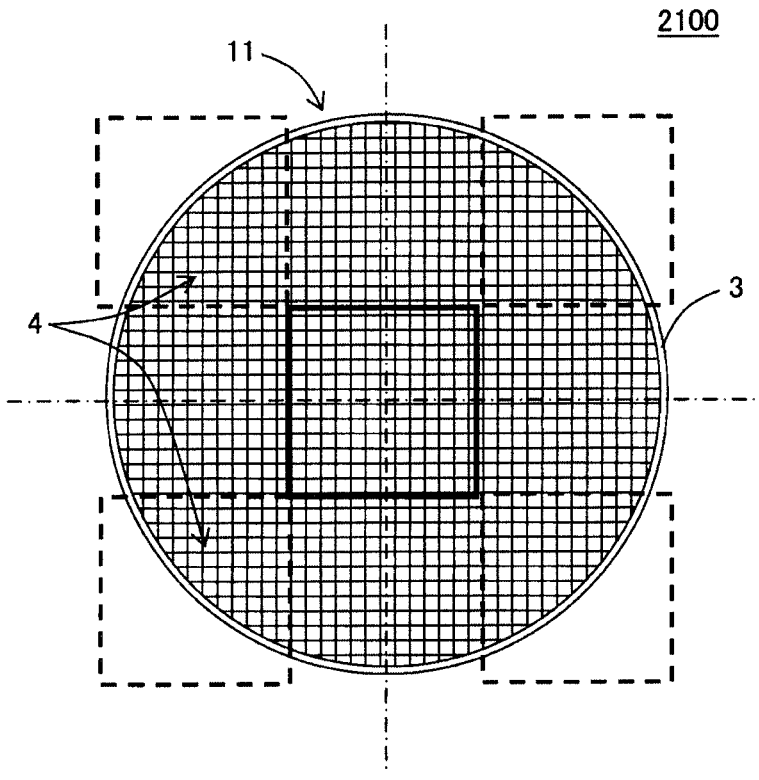
FIG. 21 is a plan view of an inflow end face, schematically showing still another embodiment of the honeycomb filter of the present invention.
Figure 22:
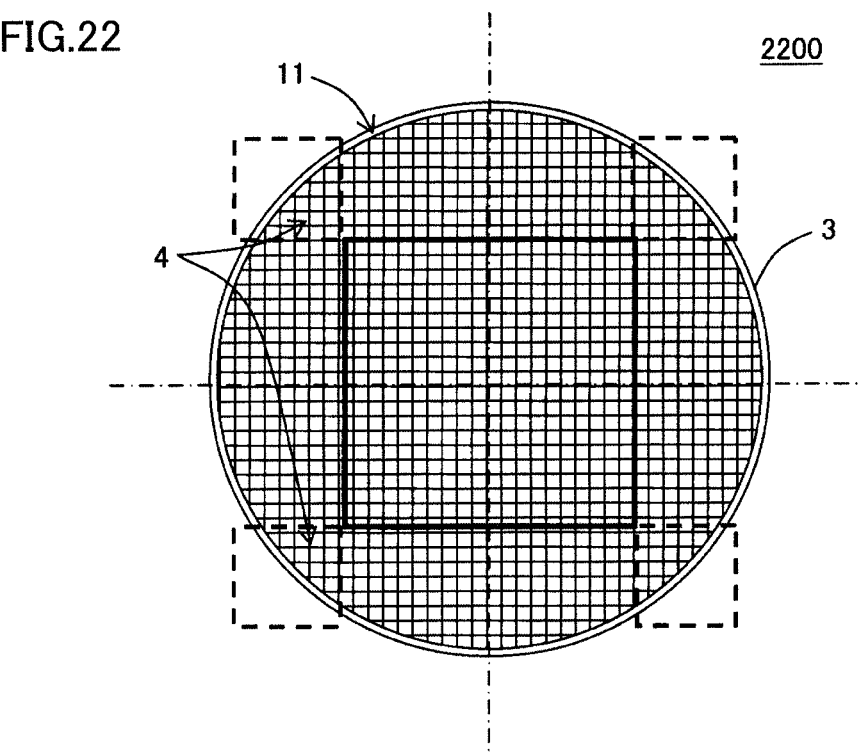
FIG. 22 is a plan view of an inflow end face, schematically showing a further embodiment of the honeycomb filter of the present invention.
Figure 23:
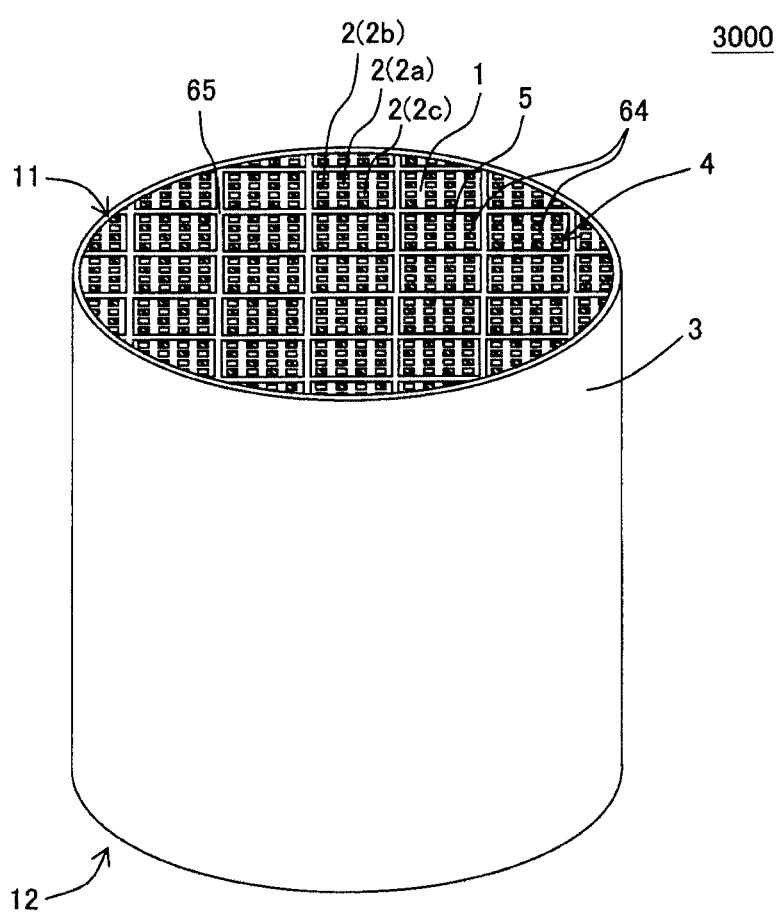
FIG. 23 is a perspective view schematically showing a still further embodiment of the honeycomb filter of the present invention and seen from the side of an inflow end face.

Next, description will be made as to the other embodiments of the honeycomb filter of the present invention with reference to FIG. 20 to FIG. 23. Here, FIG. 20 is a plan view of an inflow end face, schematically showing another embodiment of the honeycomb filter of the present invention. FIG. 21 is a plan view of an inflow end face, schematically showing still another embodiment of the honeycomb filter of the present invention. FIG. 22 is a plan view of an inflow end face, schematically showing a further embodiment of the honeycomb filter of the present invention. FIG. 23 is a perspective view schematically showing a still further embodiment of the honeycomb filter of the present invention and seen from the side of an inflow end face.

In a honeycomb filter 2000 shown in FIG. 20, a ¼ fan-shaped range of the upper left of a paper surface corresponds to a honeycomb structure body 4 which satisfies characteristics of the present invention in an inflow end face 11 of the honeycomb filter 2000. That is, in FIG. 20, the honeycomb structure body 4 of the fan-shaped range surrounded with a broken line and denoted with reference numeral 4 is constituted to satisfy Equation (1) mentioned above. Thus, in the honeycomb filter, unevenness might occur in a situation where particulate matter such as ash is deposited, in accordance with a layout in using the honeycomb filter, uneven flow of an exhaust gas, and the like. Consequently, as in the honeycomb filter 2000 shown in FIG. 20, the whole region of the end face of the honeycomb filter 2000 does not have to satisfy Equation (1) mentioned above. For example, in the honeycomb filter 2000, it is possible to effectively inhibit decrease of a trapping efficiency while acquiring a large capacity for the ash to be deposited, in accordance with the layout in using the honeycomb filter, the uneven flow of the exhaust gas, and the like. The present embodiment is effective for, for example, a case where the exhaust gas flows, in a concentrated manner, through a portion of the honeycomb filter 2000 which is surrounded with a broken line.

In a honeycomb filter 2100 shown in FIG. 21, each of ranges of four regions of four corners in an inflow end face 11 of the honeycomb filter 2100 corresponds to a honeycomb structure body 4 which satisfies the characteristics of the present invention. That is, in FIG. 21, the honeycomb structure body 4 of the range surrounded with a broken line and denoted with reference numeral 4 is constituted to satisfy Equation (1) and Equation (2) mentioned above. The honeycomb filter 2100 shown in FIG. 21 is effective for, for example, a case where an exhaust gas flows, in a concentrated manner, through a central portion of the honeycomb filter 2100 which is surrounded with a solid line. It is to be noted that the honeycomb filter 2100 shown in FIG. 21 does not have to satisfy Equation (1) mentioned above in a range other than the ranges which are surrounded with the broken line and denoted with the reference numeral 4.

In a honeycomb filter 2200 shown in FIG. 22, each of ranges of four regions of four corners shown by broken lines in an inflow end face 11 of the honeycomb filter 2200 corresponds to a honeycomb structure body 4 which satisfies the characteristics of the present invention. The honeycomb filter 2200 shown in FIG. 22 is effective for, for example, a case where an exhaust gas flows less in the vicinity of a circumferential portion.

A honeycomb filter 3000 shown in FIG. 23 is the honeycomb filter 3000 including honeycomb structure bodies 4, and a plugging portion 5 disposed in either one of end portions of each of cells 2 formed in the honeycomb structure bodies 4. Especially in the honeycomb filter 3000, each of the honeycomb structure bodies 4 is constituted of a pillar-shaped honeycomb segment 64, and side surfaces of a plurality of honeycomb segments 64 are bonded to one another by a bonding layer 65. That is, in the honeycomb filter 3000 of the present embodiment, each of the individual honeycomb segments 64 constituting the honeycomb filter 3000 of a segmented structure corresponds to the honeycomb structure body 4 in the honeycomb filter 3000. Here, "the honeycomb filter of the segmented structure" is a honeycomb filter having a constitution in which a plurality of individually prepared honeycomb segments 64 are bonded. It is to be noted that the honeycomb filter 100 in which the partition walls 1 of the honeycomb structure body 4 are all monolithically formed as shown in FIG. 1 to FIG. 7 will occasionally be referred to as "a monolithic honeycomb filter". The honeycomb filter of the present invention may be "the honeycomb filter of the segmented structure" or "the monolithic honeycomb filter".

In the honeycomb filter 3000, it is preferable that at least one of the honeycomb segments 64 has a constitution similar to the honeycomb structure body 4 (see FIG. 4 and the like) of the honeycomb filter 100 of the hitherto described first embodiment (see FIG. 4 and the like). Specifically, at least one of the honeycomb segments 64 has a plurality of cell rows in which two or more cells 2 are linearly arranged along one direction. Then, the plurality of cell rows include a first cell row constituted of at least one of an inflow cell $2a$ and an outflow cell $2b$, and a through-cell $2c$, and a second cell row which does not include the through-cells $2c$. Furthermore, at least one of the honeycomb segments 64 is constituted to satisfy Equation (1) mentioned above. Also in the honeycomb filter 3000, technological effects similar to those of the honeycomb filter 100 of the hitherto described first embodiment (see FIG. 4 and the like) are obtainable. The plurality of honeycomb segments 64 may have the same cell structure, or may have different cell structures.

It is preferable that a circumferential wall 3 in the honeycomb filter 3000 is a circumference coating layer made of a circumference coating material coated on a circumference of a bonded body in which the plurality of honeycomb segments 64 are bonded. Furthermore, in the bonded body in which the plurality of honeycomb segments 64 are bonded, it is preferable that a circumferential portion of the bonded body is ground and the above-mentioned circumference coating layer is disposed.

In the honeycomb filter 3000 shown in FIG. 23, a shape of the cells 2 is quadrangular. However, as the shape of the cells 2 in the respective honeycomb segments 64, the shapes of the cells in the hitherto described honeycomb filters of the first embodiment to the thirteenth embodiment are employable.

(5) Manufacturing Method of Honeycomb Filter

Next, description will be made as to a method of manufacturing the honeycomb filter of the present invention. An example of the manufacturing method of the honeycomb filter of the present invention is a method including a step of preparing a honeycomb formed body, a step of forming plugging portions in open ends of cells, and a step of drying and firing the honeycomb formed body.

(5-1) Forming Step:

A forming step is a step of extruding a kneaded material obtained by kneading a forming raw material into a honeycomb shape to obtain the honeycomb formed body. The honeycomb formed body has partition walls which define cells extending from a first end face to a second end face, and a circumferential wall formed to surround an outermost circumference of the partition walls. A part of a honeycomb structure constituted of the partition walls corresponds to a honeycomb structure body. In the forming step, the forming raw material is initially kneaded to obtain the kneaded material. Next, the obtained kneaded material is extruded, thereby obtaining the honeycomb formed body in which the partition walls and the circumferential wall are monolithically formed.

It is preferable that the forming raw material is a ceramic raw material to which a dispersing medium and an additive are added. Examples of the additive include an organic binder, a pore former, and a surfactant. An example of the dispersing medium is water. As the forming raw material, there is usable a material similar to a forming raw material used in a heretofore known honeycomb filter manufacturing method.

An example of a method of kneading the forming raw material to form the kneaded material is a method in which a kneader, a vacuum pugmill or the like is used. The extrusion can be performed by using an extruding die in which slits corresponding to a sectional shape of the honeycomb formed body are formed. For example, as the extruding die, it is preferable to use a die in which there are formed slits corresponding to the shapes of the cells in each of the hitherto described honeycomb filters of the first embodiment to the tenth embodiment.

(5-2) Plugging Step:

A plugging step is a step of plugging open ends of the cells to form the plugging portions. For example, in the plugging step, the open ends of the cells of parts are plugged with a material similar to the material used in manufacturing the honeycomb formed body, to form the plugging portions. The method of forming the plugging portions can be performed in conformity with the heretofore known honeycomb filter manufacturing method.

(5-3) Firing Step:

A firing step is a step of firing the honeycomb formed body in which the plugging portions are formed, to obtain the honeycomb filter. The obtained honeycomb formed body may be dried with, for example, microwaves and hot air, before the honeycomb formed body in which the plugging portions are formed is fired. Alternatively, for example, the firing step of firing the honeycomb formed body is initially performed before the plugging portions are formed, and then, the above-mentioned plugging step may be performed to a honeycomb fired body obtained in the firing step.

A firing temperature in firing the honeycomb formed body can suitably be determined in accordance with a material of the honeycomb formed body. For example, when the material of the honeycomb formed body is cordierite, the firing temperature is preferably from 1380 to 1450° C. and further preferably from 1400 to 1440° C. Furthermore, it is preferable that a firing time is from about 4 to 6 hours as a time to keep the highest temperature.

EXAMPLES

Hereinafter, the present invention will further specifically be described in accordance with examples, but the present invention is not limited to these examples.

Example 1

To 100 parts by mass of cordierite forming raw material, 0.5 parts by mass of pore former, 33 parts by mass of dispersing medium and 5.6 parts by mass of organic binder were added, mixed and kneaded to prepare a kneaded material. As the cordierite forming raw material, alumina, aluminum hydroxide, kaolin, talc and silica were used. Water was used as the dispersing medium, a water absorbable polymer having an average particle diameter of 10 to 50 µm was used as the pore former, methylcellulose was used as the organic binder, and dextrin was used as a dispersing agent.

Next, the kneaded material was extruded by using a predetermined die, to obtain a honeycomb formed body in which a cell shape was substantially quadrangular and an overall shape was a round pillar shape.

Then, the honeycomb formed body was dried in a hot air drier. As drying conditions, the drying was performed at 95 to 145° C.

Next, plugging portions were formed in the dried honeycomb formed body. Specifically, a mask was initially applied to an inflow end face of the honeycomb formed body to cover inflow cells. Afterward, an end portion of the masked honeycomb formed body was immersed into a plugging slurry, to charge the plugging slurry into open ends of outflow cells which were not masked. Afterward, also as to an outflow end face of the honeycomb formed body, the plugging slurry was charged into open ends of the inflow cells by a method similar to the above method. Then, the honeycomb formed body in which the plugging portions were formed was further dried with the hot air drier.

Next, the dried honeycomb formed body was fired. As firing conditions, the honeycomb formed body was fired at 1350 to 1440° C. for 10 hours, thereby preparing a honeycomb filter of Example 1.

In the honeycomb filter of Example 1, a thickness of partition walls was 203 µm. Each of cells had a quadrangular shape of which corner portions were formed in a curved shape of a curvature radius of 20 µm. Table 1 shows the thickness of the partition walls and the cell shape, in a column of "cell structure". It is to be noted that Table 1 simply shows a polygonal shape as a shape in which corner portions of the polygonal shape are formed in a curved shape in a column of "cell shape". Additionally, the curvature radius was measured by the following method. Initially, an inflow end face and an outflow end face of the honeycomb filter were imaged by using an image measuring instrument, for example, "VM-2520 (tradename)" manufactured by Nikon Corporation. Next, images of the imaged inflow end face and outflow end face were analyzed, thereby obtaining a curvature radius of each of the corner portions of the cells. In Example 1, curvature radiuses of 20 regions of the inflow end face and 20 regions of the outflow end face were measured, and an average value of the radiuses was considered as the curvature radius of the corner portions of the cells. In Example 1, the curvature radius of the corner portions of the cells was 20 µm.

In the honeycomb filter of Example 1, a shape of a cross section perpendicular to an axial direction was round, and a honeycomb structure body had a first cell row 15 and a second cell row 16 as shown in FIG. 4. A diameter of the inflow end face of the honeycomb filter was 118.4 mm, and a length (a total length) from the inflow end face to the outflow end face was 120.0 mm. Table 1 shows a shape of the honeycomb filter of Example 1 in columns of "sectional shape", "diameter" and "total length".

Table 2 shows a width P1 (mm) of the first cell row and a width P2 (mm) of the second cell row in the honeycomb filter of Example 1. Furthermore, Table 2 shows a value of "100−(P2/P1×100)" in a column of "P1, P2 ratio (%)". Table 2 shows a value of "(P1+P2)/2" in a column of "average (mm) of P1 and P2". Table 2 shows a value of a curvature radius R of the corner portions of the cells in a column of "curvature radius (μm)". Table 2 shows a value of "(R/1000)/((P1+P2)/2)×100" in a column of "X (%)". The "X (%)" in Table 2 is a value represented by Equation (2) in the present description. Furthermore, Table 2 shows a cell structure in the honeycomb filter of each of the examples and comparative examples in a column of "cell structure". For example, when the table shows FIG. 4 in the column of "cell structure", it is indicated that the manufactured honeycomb filter has the cell structure shown in FIG. 4.

TABLE 1

| | Material | Arrangement pattern | Cell structure | | Sectional shape | Dia. (mm) | Long dia. (mm) | Short dia. (mm) | Total length (mm) | Porosity (%) |
| | | | Thickness of partition walls (μm) | Cell shape | | | | | | |
|---|---|---|---|---|---|---|---|---|---|---|
| Example 1 | Cordierite | Pattern 1 | 203 | Quadrangular | Round | 118.4 | — | — | 120.0 | 63 |
| Example 2 | Cordierite | Pattern 1 | 203 | Quadrangular | Round | 118.4 | — | — | 120.0 | 63 |
| Example 3 | Cordierite | Pattern 1 | 203 | Quadrangular | Round | 118.4 | — | — | 120.0 | 63 |
| Example 4 | Cordierite | Pattern 1 | 203 | Quadrangular | Round | 118.4 | — | — | 120.0 | 63 |
| Example 5 | Cordierite | Pattern 1 | 203 | Quadrangular | Round | 118.4 | — | — | 120.0 | 63 |
| Example 6 | Cordierite | Pattern 1 | 254 | Quadrangular | Round | 143.8 | — | — | 203.2 | 48 |
| Example 7 | Cordierite | Pattern 1 | 254 | Quadrangular | Round | 143.8 | — | — | 203.2 | 48 |
| Example 8 | SiC | Pattern 1 | 300 | Quadrangular | Round | 143.8 | — | — | 254.0 | 58 |
| Example 9 | SiC | Pattern 1 | 300 | Quadrangular | Round | 143.8 | — | — | 254.0 | 58 |
| Example 10 | Cordierite | Pattern 1 | 300 | Quadrangular, octagonal | Round | 172 | — | — | 177.8 | 52 |
| Example 11 | Cordierite | Pattern 1 | 300 | Quadrangular, octagonal | Round | 172 | — | — | 177.8 | 52 |
| Example 12 | Cordierite | Pattern 1 | 203 | Quadrangular, octagonal | Elliptic | — | 228.6 | 137.2 | 203.2 | 58 |
| Example 13 | Cordierite | Pattern 1 | 203 | Quadrangular, octagonal | Elliptic | — | 228.6 | 137.2 | 203.2 | 58 |
| Example 14 | Cordierite | Pattern 1 | 254 | Hexagonal | Round | 172 | — | — | 177.8 | 52 |
| Example 15 | Cordierite | Pattern 1 | 254 | Hexagonal | Round | 172 | — | — | 177.8 | 52 |
| Example 16 | Cordierite | Pattern 1 | 300 | Hexagonal | Round | 143.8 | — | — | 203.2 | 65 |
| Example 17 | Cordierite | Pattern 1 | 300 | Hexagonal | Round | 143.8 | — | — | 203.2 | 65 |
| Example 18 | Cordierite | Pattern 1 | 165 | Quadrangular | Round | 143.8 | — | — | 152.4 | 48 |
| Example 19 | Cordierite | Pattern 1 | 165 | Quadrangular | Round | 143.8 | — | — | 152.4 | 48 |
| Example 20 | Cordierite | Pattern 1 | 254 | Quadrangular, octagonal | HAC | 266.7 | — | — | 304.8 | 65 |
| Example 21 | Cordierite | Pattern 1 | 254 | Quadrangular, octagonal | HAC | 266.7 | — | — | 304.8 | 65 |

TABLE 2

Figure 16:
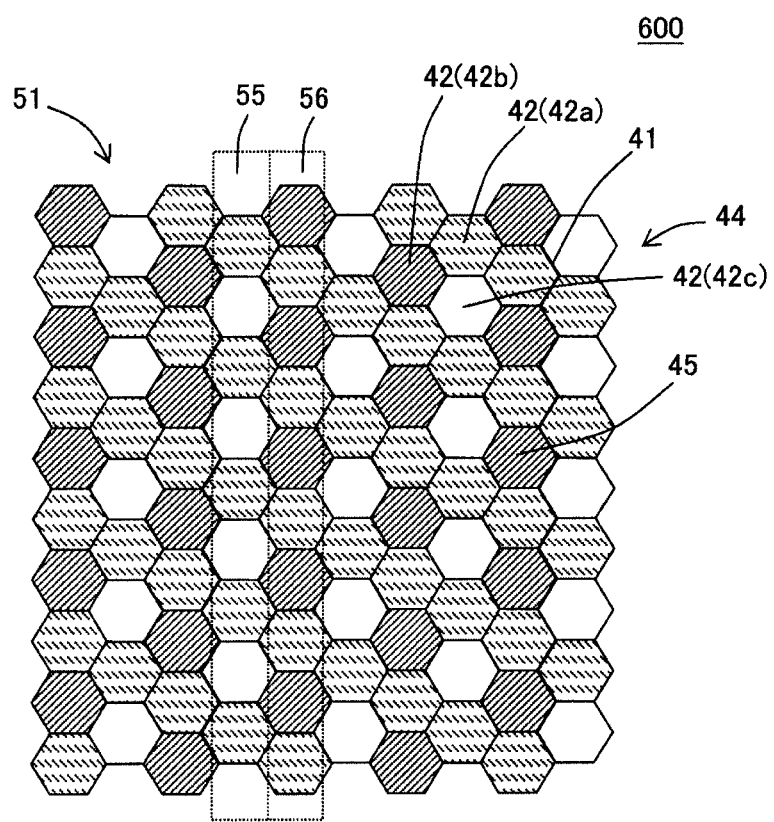
FIG. 16 is an enlarged plan view of an enlarged part of an inflow end face, schematically showing a sixth embodiment of the honeycomb filter of the present invention.
Figure 17:
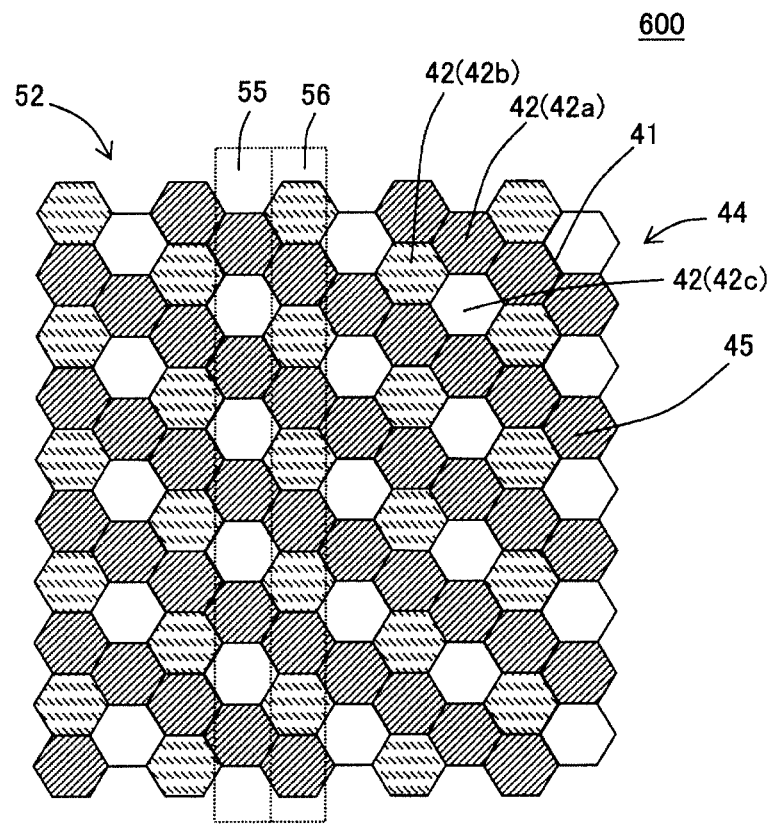
FIG. 17 is an enlarged plan view of an enlarged part of an outflow end face, schematically showing the sixth embodiment of the honeycomb filter of the present invention.
Figure 18:
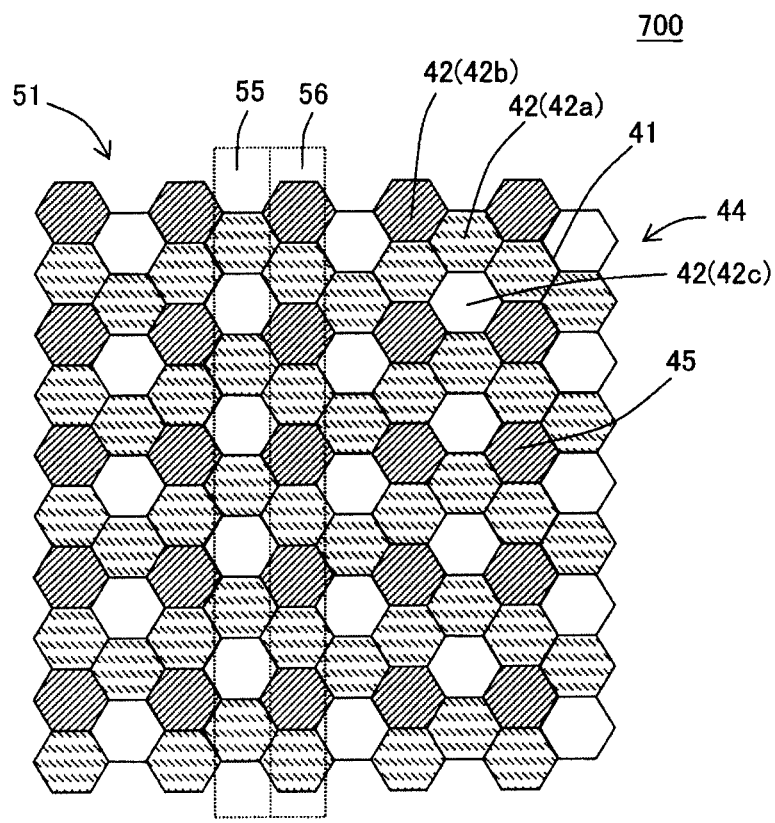
FIG. 18 is an enlarged plan view of an enlarged part of an inflow end face, schematically showing a seventh embodiment of the honeycomb filter of the present invention.
Figure 19:
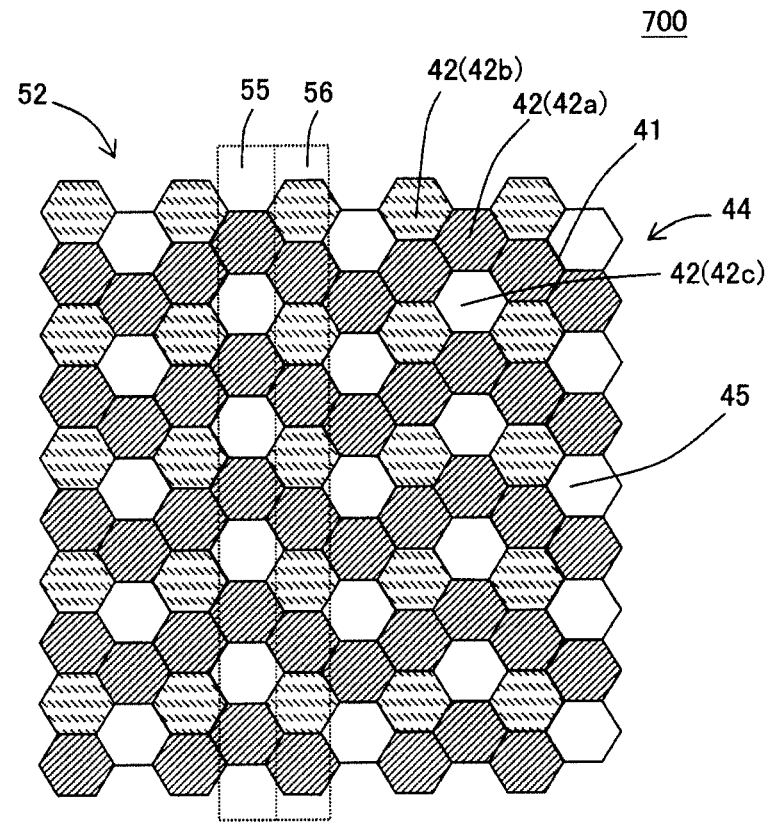
FIG. 19 is an enlarged plan view of an enlarged part of an outflow end face, schematically showing the seventh embodiment of the honeycomb filter of the present invention.

| | P1 (mm) | P2 (mm) | P1, P2 ratio (%) | Average of P1 and P2 (mm) | Curvature radius (μm) | X (%) | Cell structure |
|---|---|---|---|---|---|---|---|
| Example 1 | 1.54 | 1.47 | 4.5 | 1.505 | 20 | 1.3 | FIG. 4 |
| Example 2 | 1.90 | 1.47 | 22.6 | 1.685 | 20 | 1.2 | FIG. 4 |
| Example 3 | 2.80 | 1.47 | 47.5 | 2.135 | 20 | 0.9 | FIG. 4 |
| Example 4 | 1.47 | 1.47 | 0.0 | 1.47 | 6 | 0.4 | FIG. 4 |
| Example 5 | 1.47 | 1.47 | 0.0 | 1.47 | 280 | 19.0 | FIG. 4 |
| Example 6 | 1.52 | 1.47 | 3.3 | 1.495 | 50 | 3.3 | FIG. 8 |
| Example 7 | 2.00 | 1.47 | 26.5 | 1.735 | 50 | 2.9 | FIG. 8 |
| Example 8 | 1.53 | 1.47 | 3.9 | 1.5 | 50 | 3.3 | FIG. 10 |
| Example 9 | 2.35 | 1.47 | 37.4 | 1.91 | 50 | 2.6 | FIG. 10 |
| Example 10 | 1.51 | 1.47 | 2.6 | 1.49 | 80 | 5.4 | FIG. 12 |
| Example 11 | 2.60 | 1.47 | 43.5 | 2.035 | 80 | 3.9 | FIG. 12 |
| Example 12 | 1.54 | 1.47 | 4.5 | 1.505 | 50 | 3.3 | FIG. 14 |
| Example 13 | 2.10 | 1.47 | 30.0 | 1.785 | 50 | 2.8 | FIG. 14 |
| Example 14 | 1.51 | 1.47 | 2.6 | 1.49 | 50 | 3.4 | FIG. 16 |
| Example 15 | 2.30 | 1.47 | 36.1 | 1.885 | 50 | 2.7 | FIG. 16 |
| Example 16 | 1.41 | 1.37 | 2.8 | 1.39 | 100 | 7.2 | FIG. 18 |
| Example 17 | 1.71 | 1.37 | 19.9 | 1.54 | 100 | 6.5 | FIG. 18 |
| Example 18 | 1.89 | 1.80 | 4.8 | 1.845 | 100 | 5.4 | FIG. 4, FIG. 20 |
| Example 19 | 2.60 | 1.80 | 30.8 | 2.2 | 100 | 4.5 | FIG. 4, FIG. 20 |
| Example 20 | 1.53 | 1.47 | 3.9 | 1.5 | 100 | 6.7 | FIG. 12, FIG. 21 |

TABLE 2-continued

|  | P1 (mm) | P2 (mm) | P1, P2 ratio (%) | Average of P1 and P2 (mm) | Curvature radius (µm) | X (%) | Cell structure |
|---|---|---|---|---|---|---|---|
| Example 21 | 1.80 | 1.47 | 18.3 | 1.635 | 100 | 6.1 | FIG. 12, FIG. 21 |

Examples 2 to 39

The procedure of Example 1 was repeated except that a cell structure, a sectional shape, a shape of a circumference and the like were changed as shown in Table 1 and Table 2, or Table 4 and Table 5, to prepare honeycomb filters of Examples 2 to 39. It is to be noted that when "pattern 1" is described in a column of "arrangement pattern" in Table 1 and Table 4, it is meant that the honeycomb filter has a cell structure in which when the number of inflow cells is compared with the number of outflow cells, the number of the inflow cells is relatively large.

In Examples 8 and 9, as a material to prepare the honeycomb filter, silicon carbide (SiC) was used. The honeycomb filters of Examples 8 and 9 are honeycomb filters of segmented structures.

Examples 40 to 56

The procedure of Example 1 was repeated except that a cell structure, a sectional shape, a shape of a circumference and the like were changed as shown in Table 7 and Table 8, or Table 10 and Table 11, to prepare honeycomb filters of Examples 40 to 56. It is to be noted that when "pattern 2" is described in a column of "arrangement pattern" in Table 7 and Table 10, it is meant that the honeycomb filter has a cell structure in which when the number of inflow cells is compared with the number of outflow cells, the number of the outflow cells is relatively large.

In Example 42, as a material to prepare the honeycomb filter, silicon carbide (SiC) was used. The honeycomb filter of Example 45 is a honeycomb filter of a segmented structure.

Comparative Examples 1 to 22

The procedure of Example 1 was repeated except that a cell structure, a sectional shape, a shape of a circumference and the like were changed as shown in Table 7 and Table 8, or Table 10 and Table 11, to prepare honeycomb filters of Comparative Examples 1 to 22. In Comparative Example 6, as a material to prepare the honeycomb filter, silicon carbide (SiC) was used. The honeycomb filter of Comparative Example 6 is a honeycomb filter of a segmented structure.

As to the honeycomb filters of Examples 1 to 56 and Comparative Examples 1 to 22, evaluations were performed as to "soot leakage", "pressure loss-1", "pressure loss-2" and "general judgment" by the following methods. Table 3, Table 6, Table 9 and Table 12 show the results.

(Soot Leakage)

Initially, as to the honeycomb filter of each example, a hot vibration test was carried out by the following method. Initially, a ceramic mat which was not thermally expandable was wound around a circumferential surface of the honeycomb filter. Next, the honeycomb filter around which the ceramic mat was wound was stored in two divided stainless steel (SUS430) can bodies, and then, the can bodies were welded, to store the honeycomb filter in the can body. Hereinafter, the can body in which the honeycomb filter is stored will be referred to as "the can body for the test". Next, the can body for the test was attached to a hot vibration test device, and a burning gas of propane was supplied from the hot vibration test device into the can body for the test. The burning gas was supplied at a gas temperature of 1,000° C. at maximum in the inflow end face of the honeycomb filter, and a gas flow rate was set to 2.5 Nm³/min. Furthermore, heating and cooling were repeated at an interval of 20 minutes to provide a heat cycle. Next, in a state where the above burning gas was continuously supplied into the can body for the test, vibration was applied to this can body in a direction perpendicular to an extending direction of the cells of the honeycomb filter. As conditions of the vibration applied to the can body, vibration of 50 G was applied at 150 Hz for 20 hours. Afterward, the can body for the test was rotated as much as 90° around a central axis of the honeycomb filter. The above operation was repeated four times in total. Therefore, a test time was 20 hours×4 times, i.e., 80 hours in total.

In the evaluation of the soot leakage, the above-mentioned hot vibration test was carried out, and then, soot was deposited in an amount of 4 g/L in the honeycomb filter by use of a PM generator, to confirm leakage of the soot from the honeycomb filter. When the soot leakage from cells (i.e., inflow cells and outflow cells) other than through-cells of the honeycomb filter was not confirmed, the evaluation was "A". When soot leakage from one region was confirmed from the cells (i.e., the inflow cells and the outflow cells) other than the through-cells of the honeycomb filter, the evaluation was "C". When soot leakage from two or more regions was confirmed from the cells (i.e., the inflow cells and the outflow cells) other than the through-cells of the honeycomb filter, the evaluation was "D". In the evaluation of the soot leakage, the evaluation "A" was a pass.

(Pressure Loss-1)

Initially, a PM containing gas was generated by using a PM generator described in JP-A-2007-155708. Additionally, light oil was used as fuel of the PM generator. The PM containing gas generated from this PM generator was introduced from an inflow end face side of the honeycomb filter. Then, when the gas kept at a constant temperature of 200° C. flowed at a flow rate of 10 Nm³/min, a pressure difference between the inflow end face and the outflow end face in the honeycomb filter was obtained. The pressure difference obtained when soot was deposited in an amount of 4 g/L in the honeycomb filter was "a pressure loss value of the honeycomb filter" in "pressure loss-1". Then, when the measured pressure loss value was compared with a pressure loss value of an evaluation standard mentioned below, a honeycomb filter in which a pressure loss value was equal to or less than that of the evaluation standard was evaluated "A", a honeycomb filter in which a pressure loss rise remained within 5% was evaluated as "B", and a honeycomb filter in which a pressure loss rise in excess of 5% was seen was evaluated as "C". In the evaluation of the pressure loss, the evaluation "A" or the evaluation "B" was a pass. In the evaluation of "pressure loss-1", the honeycomb filter of the evaluation standard was evaluated as "A".

(Pressure Loss-2)

Initially, the PM containing gas was generated by using the PM generator described in JP-A-2007-155708. Additionally, the light oil was used as the fuel of the PM generator. The PM containing gas generated from this PM generator was introduced from the inflow end face side of the honeycomb filter. In this way, ash in the PM containing gas was deposited in a range of ⅓ of a total length of the honeycomb filter on the surfaces of the partition walls of the honeycomb filter. Then, when the gas kept at the constant temperature of 200° C. flowed at a flow rate of 10 Nm³/min, a pressure difference between the inflow end face and the outflow end face in the honeycomb filter was obtained. The pressure difference obtained in this manner was considered as "a pressure loss value of the honeycomb filter" in "pressure loss-2". Then, when the measured pressure loss value was compared with the pressure loss value of the evaluation standard mentioned below, a honeycomb filter in which a pressure loss decrease of 5% or more and less than 10% was seen was evaluated "B", and a honeycomb filter in which a pressure loss decrease of 10% or more was seen was evaluated as "A". Furthermore, a honeycomb filter in which a pressure loss decrease was less than 5% or the pressure loss increased was evaluated as "C". In the evaluation of the pressure loss, the evaluation "A" or the evaluation "B" was considered to be excellent. In the evaluation of "pressure loss-2", the honeycomb filter of the evaluation standard was evaluated as "C".

In the evaluations of "pressure loss-1" and "pressure loss-2", respective evaluation standards are as follows.

In Examples 1 to 5 and 40 and Comparative Examples 1 to 4, Comparative Example 1 is the evaluation standard.

In Examples 6, 7 and 41 and Comparative Example 5, Comparative Example 5 is the evaluation standard.

In Examples 8, 9 and 42 and Comparative Example 6, Comparative Example 6 is the evaluation standard.

In Examples 10, 11 and 43 and Comparative Example 7, Comparative Example 7 is the evaluation standard.

In Examples 12, 13 and 44 and Comparative Example 8, Comparative Example 8 is the evaluation standard.

In Examples 14, 15 and 45 and Comparative Example 9, Comparative Example 9 is the evaluation standard.

In Examples 16, 17 and 46 and Comparative Example 10, Comparative Example 10 is the evaluation standard.

In Examples 18, 19 and 47 and Comparative Example 11, Comparative Example 11 is the evaluation standard.

In Examples 20, 21 and 48 and Comparative Example 12, Comparative Example 12 is the evaluation standard.

In Examples 22 to 25 and 49 and Comparative Examples 13 to 15, Comparative Example 13 is the evaluation standard.

In Examples 26, 27 and 50 and Comparative Example 16, Comparative Example 16 is the evaluation standard.

In Examples 28, 29 and 51 and Comparative Example 17, Comparative Example 17 is the evaluation standard.

In Examples 30, 31 and 52 and Comparative Example 18, Comparative Example 18 is the evaluation standard.

In Examples 32, 33 and 53 and Comparative Example 19, Comparative Example 19 is the evaluation standard.

In Examples 34, 35 and 54 and Comparative Example 20, Comparative Example 20 is the evaluation standard.

In Examples 36, 37 and 55 and Comparative Example 21, Comparative Example 21 is the evaluation standard.

In Examples 38, 39 and 56 and Comparative Example 22, Comparative Example 22 is the evaluation standard.

(General Judgment)

When the honeycomb filter passed both of two evaluations of "soot leakage" and "pressure loss-1", the result was "OK". When the honeycomb filter failed even in one of the two evaluations of "soot leakage" and "pressure loss-1", the result was "NG". It is to be noted that the evaluation of "pressure loss-2" is regarded as a complementary evaluation, and is not included in the results of this general judgment.

TABLE 3

| | Evaluation 1 | | | Evaluation 2 |
| --- | --- | --- | --- | --- |
| | Soot leakage | Pressure loss-1 | General judgment | Pressure loss-2 |
| Example 1 | A | A | OK | B |
| Example 2 | A | A | OK | A |
| Example 3 | A | A | OK | A |
| Example 4 | A | A | OK | C |
| Example 5 | A | B | OK | C |
| Example 6 | A | A | OK | B |
| Example 7 | A | A | OK | A |
| Example 8 | A | A | OK | B |
| Example 9 | A | A | OK | A |
| Example 10 | A | A | OK | B |
| Example 11 | A | A | OK | A |
| Example 12 | A | A | OK | B |
| Example 13 | A | A | OK | A |
| Example 14 | A | A | OK | B |
| Example 15 | A | A | OK | A |
| Example 16 | A | A | OK | B |
| Example 17 | A | A | OK | A |
| Example 18 | A | A | OK | B |
| Example 19 | A | A | OK | A |
| Example 20 | A | A | OK | B |
| Example 21 | A | A | OK | A |

TABLE 4

| | | | Cell structure | | | | | | | |
| --- | --- | --- | --- | --- | --- | --- | --- | --- | --- | --- |
| | Material | Arrangement pattern | Thickness of partition walls (μm) | Cell shape | Sectional shape | Dia. (mm) | Long dia. (mm) | Short dia. (mm) | Total length (mm) | Porosity (%) |
| Example 22 | Cordierite | Pattern 2 | 203 | Quadrangular | Round | 118.4 | — | — | 120.0 | 63 |
| Example 23 | Cordierite | Pattern 2 | 203 | Quadrangular | Round | 118.4 | — | — | 120.0 | 63 |
| Example 24 | Cordierite | Pattern 2 | 203 | Quadrangular | Round | 118.4 | — | — | 120.0 | 63 |
| Example 25 | Cordierite | Pattern 2 | 203 | Quadrangular | Round | 118.4 | — | — | 120.0 | 63 |
| Example 26 | Cordierite | Pattern 2 | 254 | Quadrangular | Round | 143.8 | — | — | 203.2 | 48 |
| Example 27 | Cordierite | Pattern 2 | 254 | Quadrangular | Round | 143.8 | — | — | 203.2 | 48 |
| Example 28 | Cordierite | Pattern 2 | 300 | Quadrangular, octagonal | Round | 172 | — | — | 177.8 | 52 |
| Example 29 | Cordierite | Pattern 2 | 300 | Quadrangular, octagonal | Round | 172 | — | — | 177.8 | 52 |

TABLE 4-continued

| | Material | Arrangement pattern | Cell structure Thickness of partition walls (μm) | Cell shape | Sectional shape | Dia. (mm) | Long dia. (mm) | Short dia. (mm) | Total length (mm) | Porosity (%) |
|---|---|---|---|---|---|---|---|---|---|---|
| Example 30 | Cordierite | Pattern 2 | 203 | Quadrangular, octagonal | Elliptic | — | 228.6 | 137.2 | 203.2 | 58 |
| Example 31 | Cordierite | Pattern 2 | 203 | Quadrangular, octagonal | Elliptic | — | 228.6 | 137.2 | 203.2 | 58 |
| Example 32 | Cordierite | Pattern 2 | 254 | Hexagonal | Round | 172 | — | — | 177.8 | 52 |
| Example 33 | Cordierite | Pattern 2 | 254 | Hexagonal | Round | 172 | — | — | 177.8 | 52 |
| Example 34 | Cordierite | Pattern 2 | 300 | Hexagonal | Round | 143.8 | — | — | 203.2 | 65 |
| Example 35 | Cordierite | Pattern 2 | 300 | Hexagonal | Round | 143.8 | — | — | 203.2 | 65 |
| Example 36 | Cordierite | Pattern 2 | 165 | Quadrangular | Round | 143.8 | — | — | 152.4 | 48 |
| Example 37 | Cordierite | Pattern 2 | 165 | Quadrangular | Round | 143.8 | — | — | 152.4 | 48 |
| Example 38 | Cordierite | Pattern 2 | 254 | Quadrangular, octagonal | Round | 266.7 | — | — | 304.8 | 65 |
| Example 39 | Cordierite | Pattern 2 | 254 | Quadrangular, octagonal | Round | 266.7 | — | — | 304.8 | 65 |

TABLE 5

Figure 24:
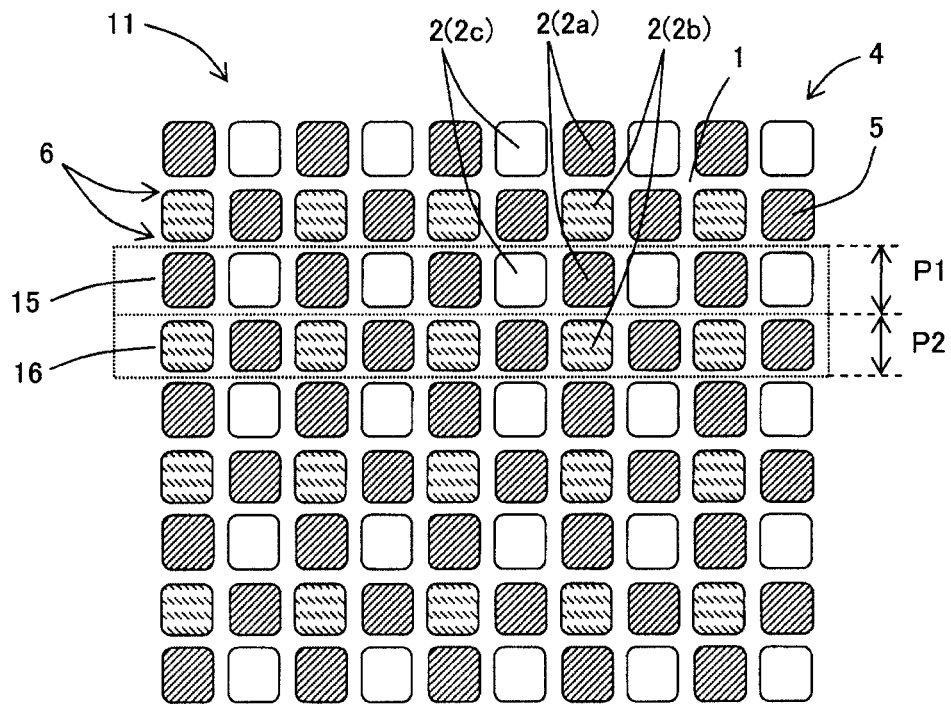
FIG. 24 is an enlarged plan view of an enlarged part of an inflow end face, schematically showing an eighth embodiment of the honeycomb filter of the present invention.
Figure 25:
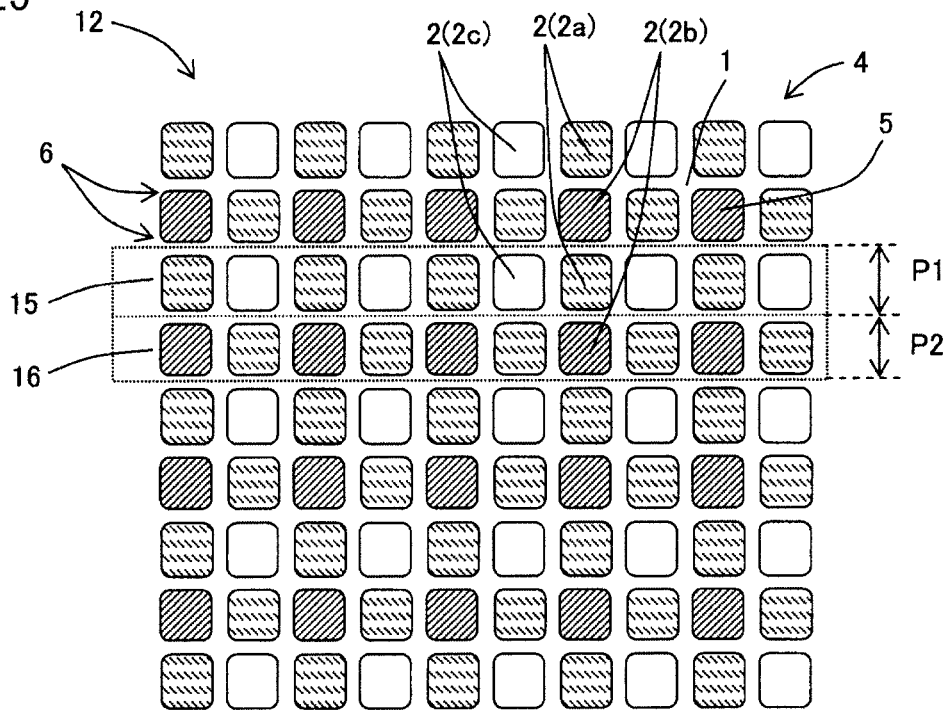
FIG. 25 is an enlarged plan view of an enlarged part of an outflow end face, schematically showing the eighth embodiment of the honeycomb filter of the present invention.
Figure 26:
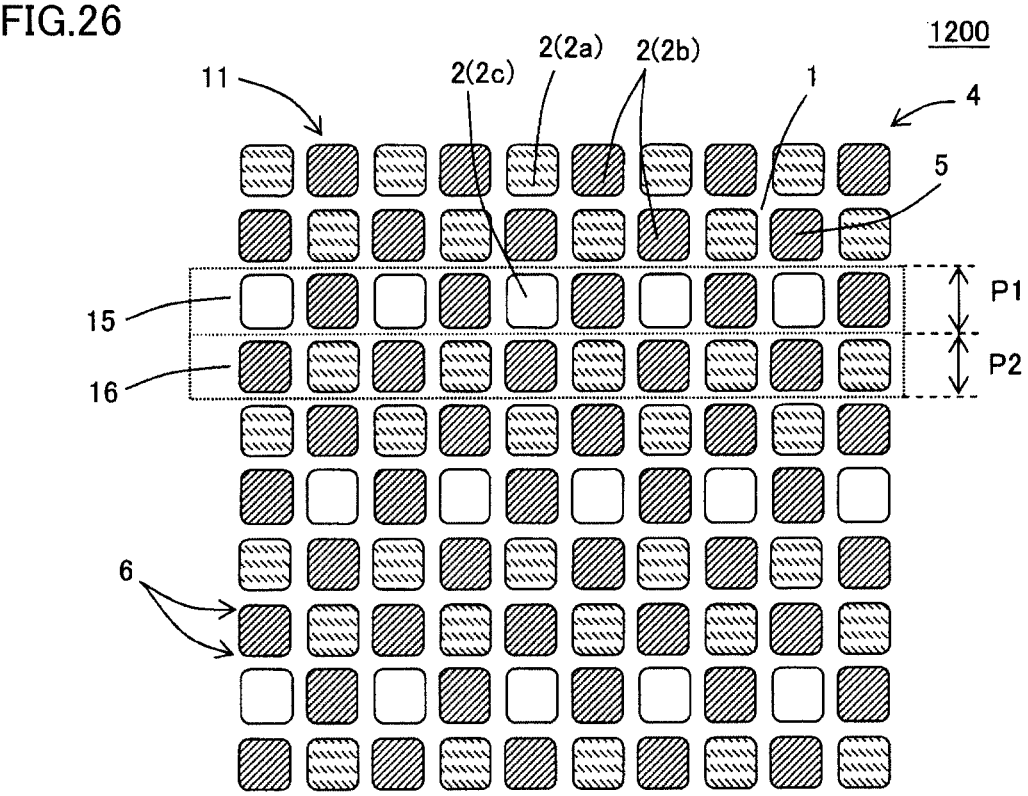
FIG. 26 is an enlarged plan view of an enlarged part of an inflow end face, schematically showing a ninth embodiment of the honeycomb filter of the present invention.
Figure 27:
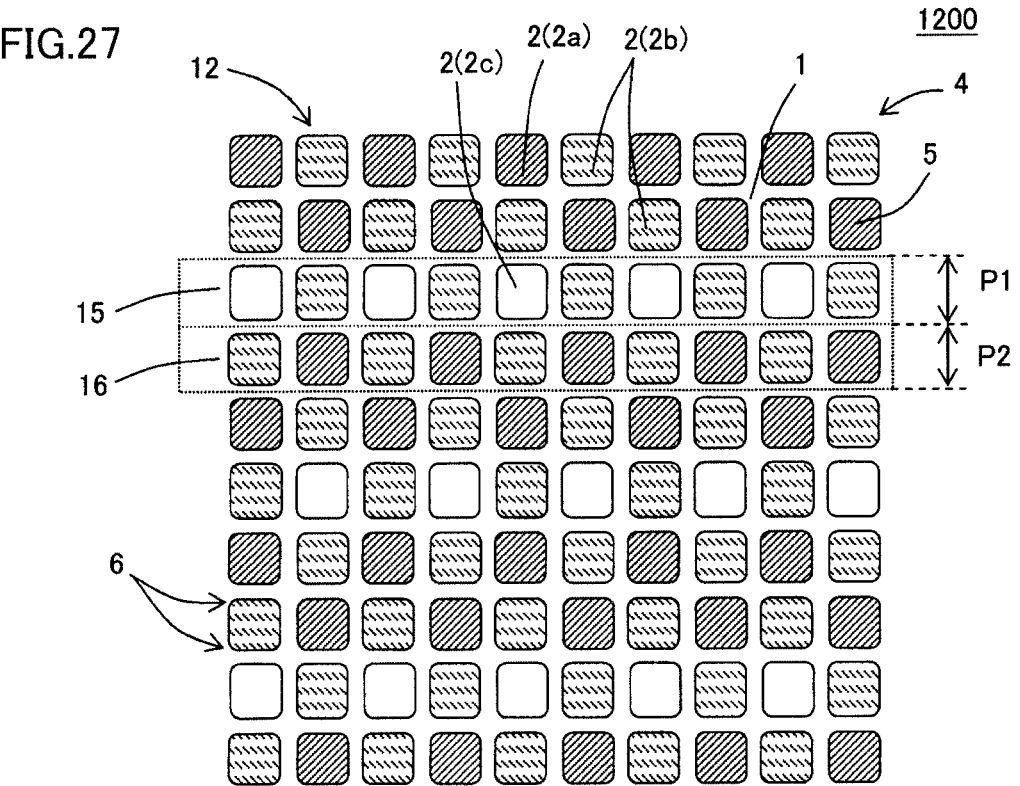
FIG. 27 is an enlarged plan view of an enlarged part of an outflow end face, schematically showing the ninth embodiment of the honeycomb filter of the present invention.
Figure 28:
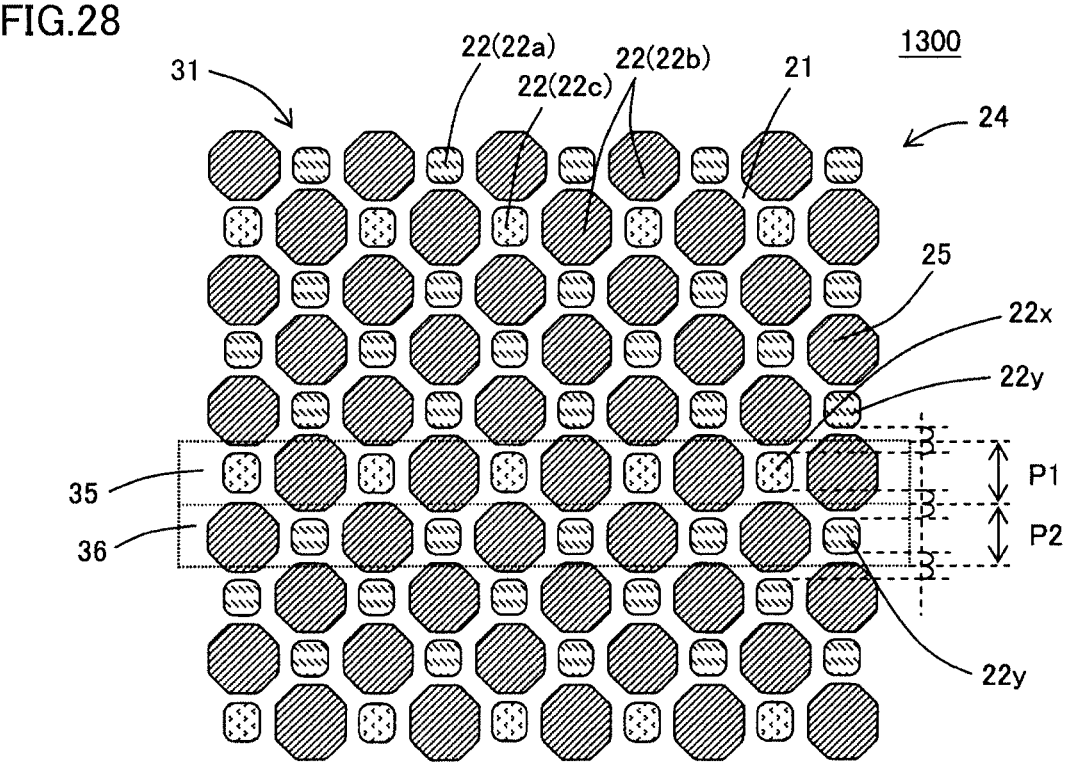
FIG. 28 is an enlarged plan view of an enlarged part of an inflow end face, schematically showing a tenth embodiment of the honeycomb filter of the present invention.
Figure 29:
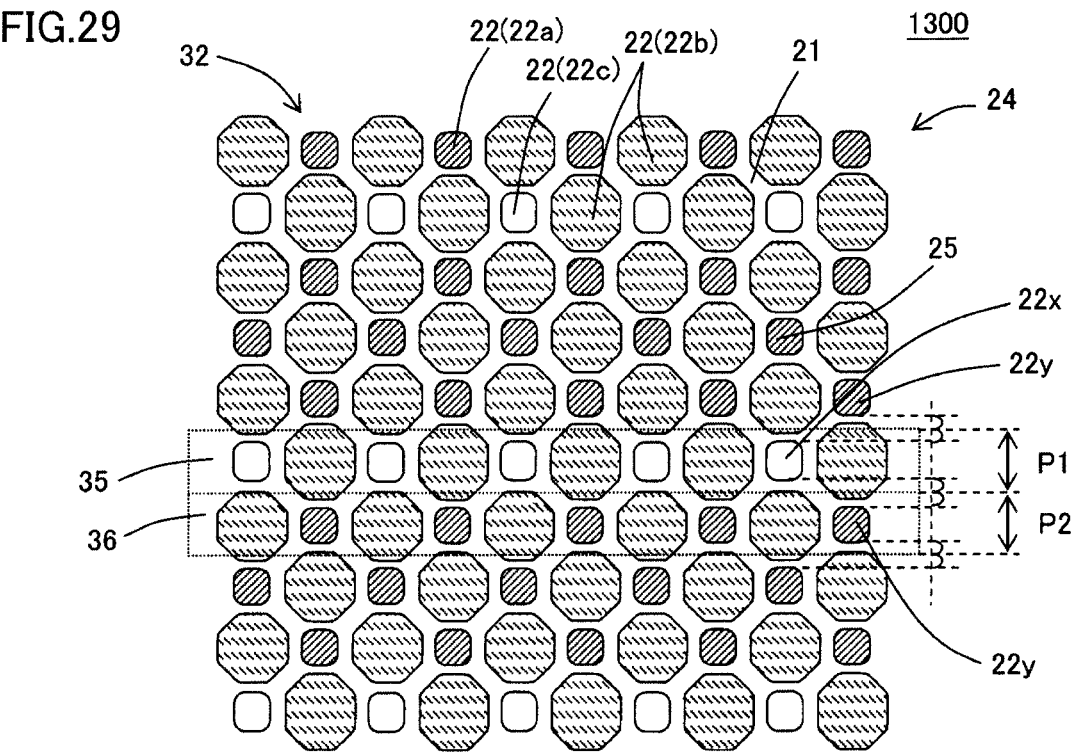
FIG. 29 is an enlarged plan view of an enlarged part of an outflow end face, schematically showing the tenth embodiment of the honeycomb filter of the present invention.
Figure 30:
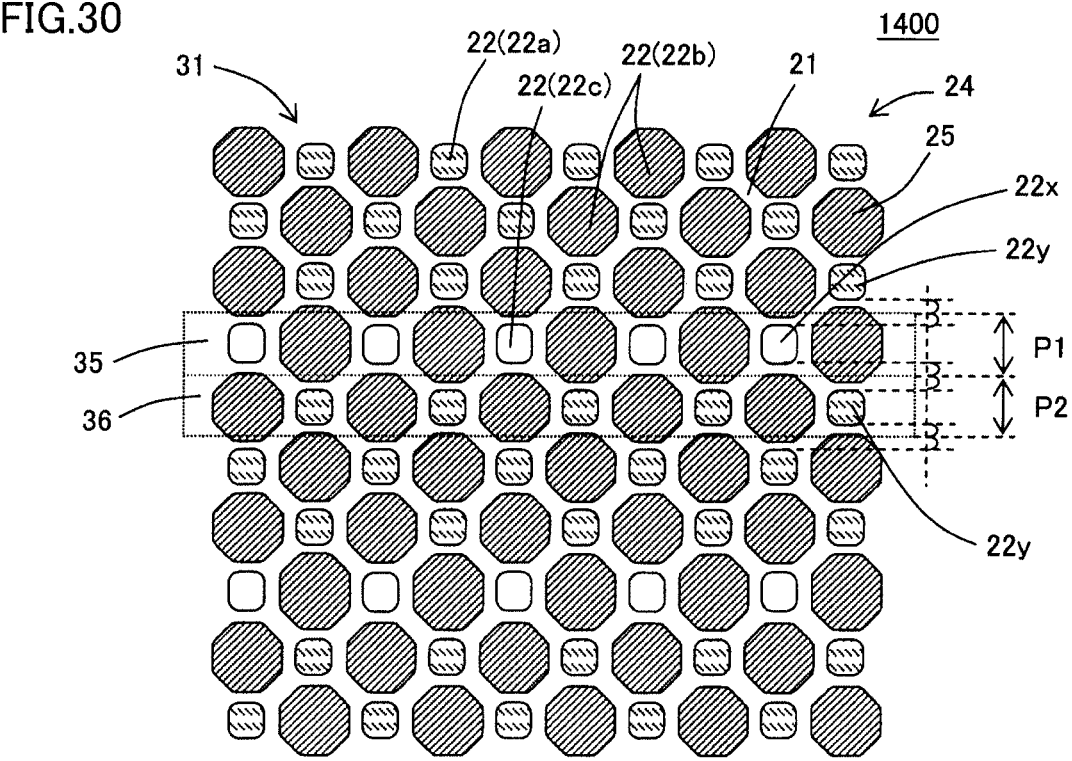
FIG. 30 is an enlarged plan view of an enlarged part of an inflow end face, schematically showing an eleventh embodiment of the honeycomb filter of the present invention.
Figure 31:
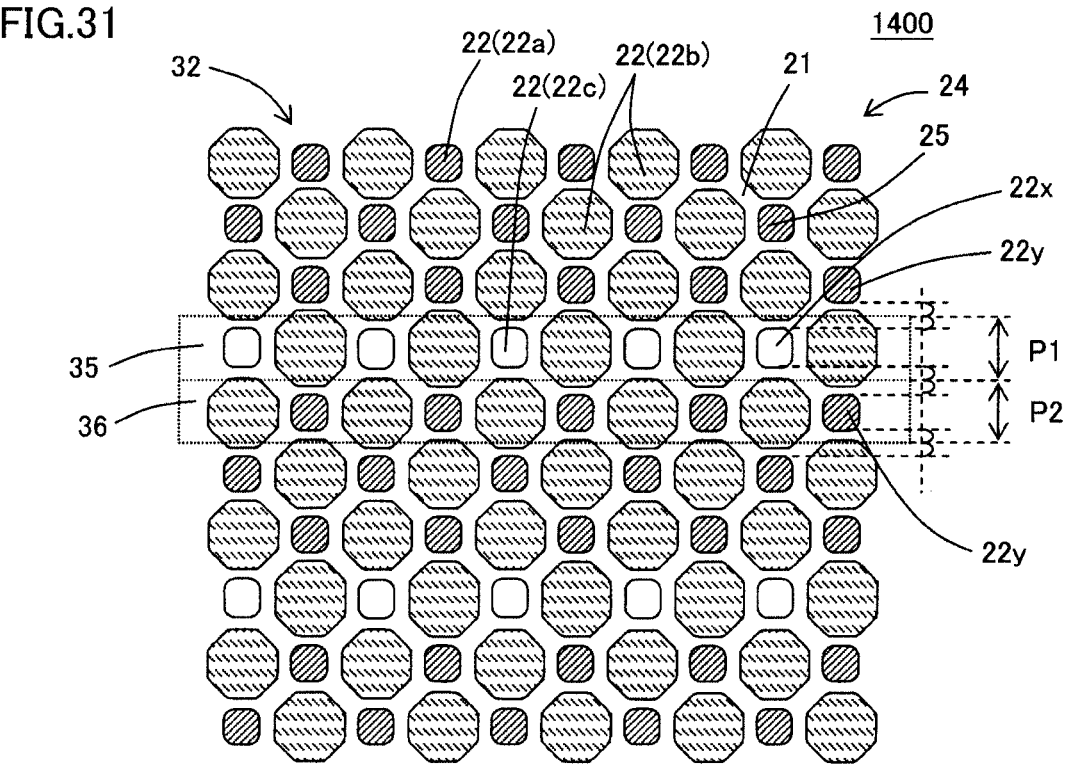
FIG. 31 is an enlarged plan view of an enlarged part of an outflow end face, schematically showing the eleventh embodiment of the honeycomb filter of the present invention.
Figure 32:
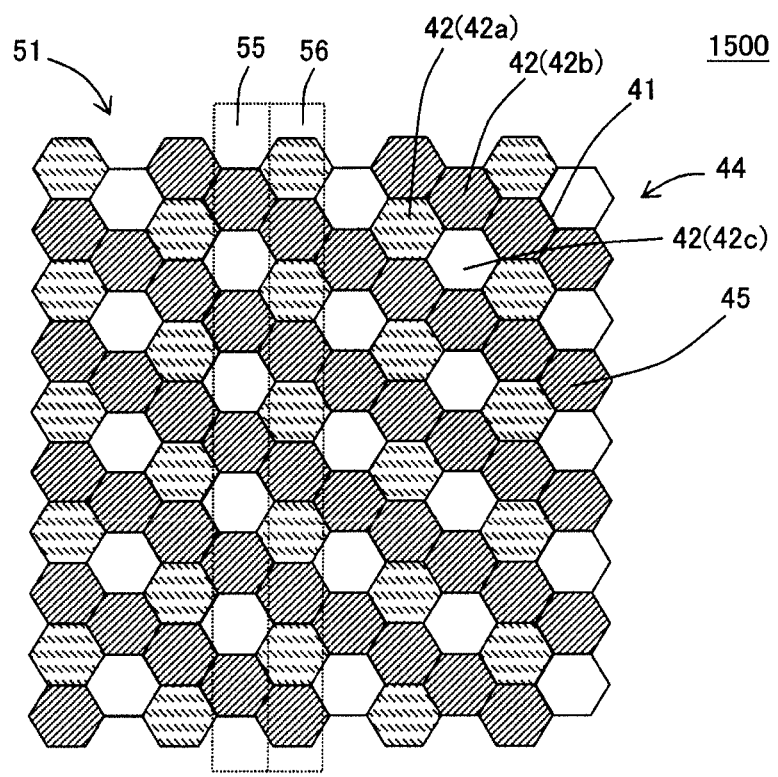
FIG. 32 is an enlarged plan view of an enlarged part of an inflow end face, schematically showing a twelfth embodiment of the honeycomb filter of the present invention.
Figure 33:
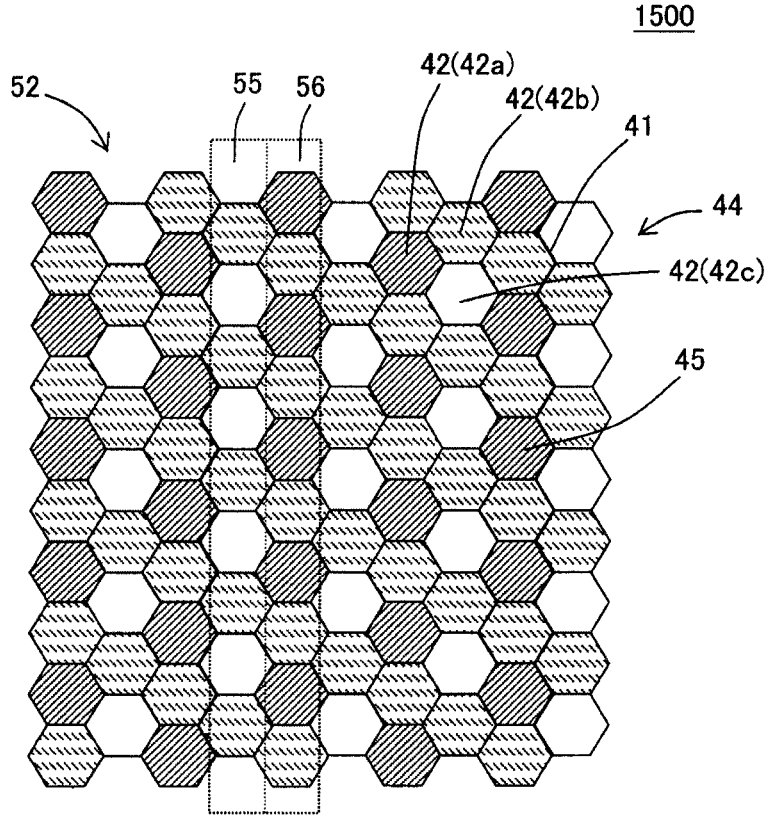
FIG. 33 is an enlarged plan view of an enlarged part of an outflow end face, schematically showing the twelfth embodiment of the honeycomb filter of the present invention.
Figure 34:
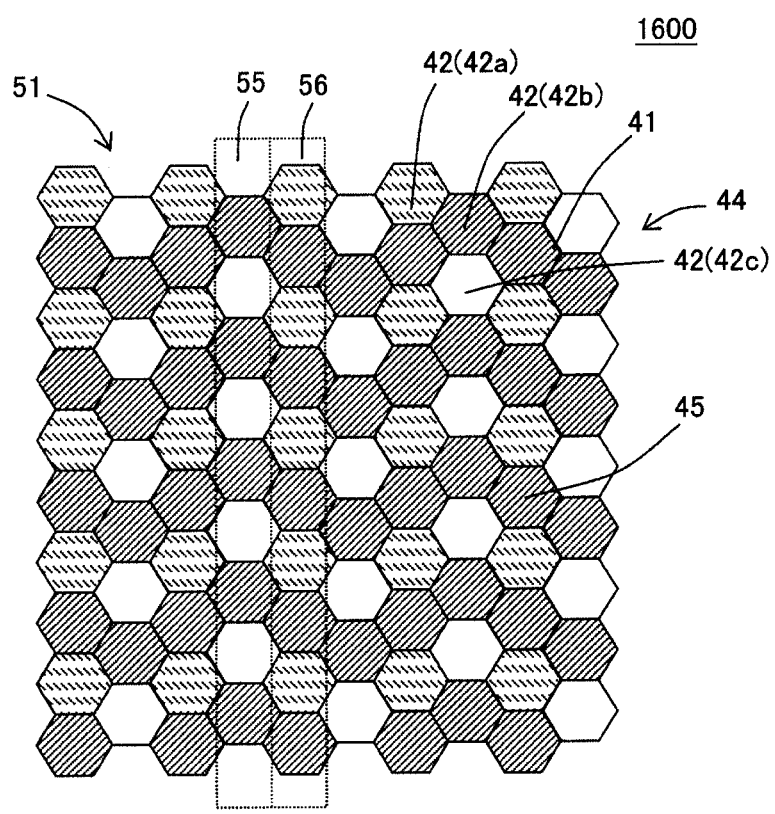
FIG. 34 is an enlarged plan view of an enlarged part of an inflow end face, schematically showing a thirteenth embodiment of the honeycomb filter of the present invention.
Figure 35:
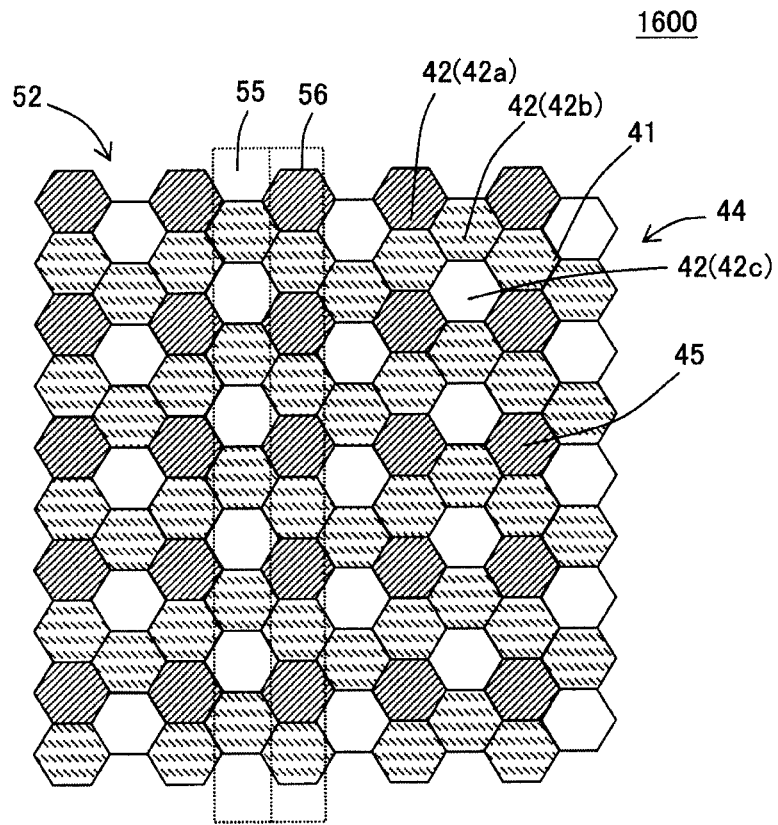
FIG. 35 is an enlarged plan view of an enlarged part of an outflow end face, schematically showing the thirteenth embodiment of the honeycomb filter of the present invention.

| | P1 (mm) | P2 (mm) | P1, P2 ratio (%) | Average of P1 and P2 (mm) | Curvature radius (μm) | X (%) | Cell structure |
|---|---|---|---|---|---|---|---|
| Example 22 | 1.54 | 1.47 | 4.5 | 1.505 | 20 | 1.3 | FIG. 24 |
| Example 23 | 1.90 | 1.47 | 22.6 | 1.685 | 20 | 1.2 | FIG. 24 |
| Example 24 | 1.47 | 1.47 | 0.0 | 1.47 | 6 | 0.4 | FIG. 4 |
| Example 25 | 1.47 | 1.47 | 0.0 | 1.47 | 280 | 19.0 | FIG. 4 |
| Example 26 | 1.52 | 1.47 | 3.3 | 1.495 | 50 | 3.3 | FIG. 26 |
| Example 27 | 2.00 | 1.47 | 26.5 | 1.735 | 50 | 2.9 | FIG. 26 |
| Example 28 | 1.51 | 1.47 | 2.6 | 1.49 | 80 | 5.4 | FIG. 28 |
| Example 29 | 2.60 | 1.47 | 43.5 | 2.035 | 80 | 3.9 | FIG. 28 |
| Example 30 | 1.54 | 1.47 | 4.5 | 1.505 | 50 | 3.3 | FIG. 30 |
| Example 31 | 2.10 | 1.47 | 30.0 | 1.785 | 50 | 2.8 | FIG. 30 |
| Example 32 | 1.51 | 1.47 | 2.6 | 1.49 | 50 | 3.4 | FIG. 32 |
| Example 33 | 2.30 | 1.47 | 36.1 | 1.885 | 50 | 2.7 | FIG. 32 |
| Example 34 | 1.41 | 1.37 | 2.8 | 1.39 | 100 | 7.2 | FIG. 34 |
| Example 35 | 1.71 | 1.37 | 19.9 | 1.54 | 100 | 6.5 | FIG. 34 |
| Example 36 | 1.89 | 1.80 | 4.8 | 1.845 | 100 | 5.4 | FIG. 24, FIG. 20 |
| Example 37 | 2.60 | 1.80 | 30.8 | 2.2 | 100 | 4.5 | FIG. 24, FIG. 20 |
| Example 38 | 1.53 | 1.47 | 3.9 | 1.5 | 100 | 6.7 | FIG. 28, FIG. 21 |
| Example 39 | 1.80 | 1.47 | 18.3 | 1.635 | 100 | 6.1 | FIG. 28, FIG. 21 |

TABLE 6

| | Evaluation 1 | | | Evaluation 2 |
|---|---|---|---|---|
| | Soot leakage | Pressure loss-1 | General judgment | Pressure loss-2 |
| Example 22 | A | A | OK | B |
| Example 23 | A | A | OK | A |
| Example 24 | A | A | OK | C |
| Example 25 | A | B | OK | C |
| Example 26 | A | A | OK | B |
| Example 27 | A | A | OK | A |
| Example 28 | A | A | OK | B |
| Example 29 | A | A | OK | A |
| Example 30 | A | A | OK | B |
| Example 31 | A | A | OK | A |
| Example 32 | A | A | OK | B |
| Example 33 | A | A | OK | A |
| Example 34 | A | A | OK | B |
| Example 35 | A | A | OK | A |
| Example 36 | A | A | OK | B |
| Example 37 | A | A | OK | A |
| Example 38 | A | A | OK | B |
| Example 39 | A | A | OK | A |

TABLE 7

| | | | Cell structure | | | | | | | |
|---|---|---|---|---|---|---|---|---|---|---|
| | Material | Arrangement pattern | Thickness of partition walls (μm) | Cell shape | Sectional shape | Dia. (mm) | Long dia. (mm) | Short dia. (mm) | Total length (mm) | Porosity (%) |
| Comparative Example 1 | Cordierite | Pattern 1 | 203 | Quadrangular | Round | 118.4 | — | — | 120.0 | 63 |
| Example 40 | Cordierite | Pattern 1 | 203 | Quadrangular | Round | 118.4 | — | — | 120.0 | 63 |
| Comparative Example 2 | Cordierite | Pattern 1 | 203 | Quadrangular | Round | 118.4 | — | — | 120.0 | 63 |
| Comparative Example 3 | Cordierite | Pattern 1 | 203 | Quadrangular | Round | 118.4 | — | — | 120.0 | 63 |
| Comparative Example 4 | Cordierite | Pattern 1 | 203 | Quadrangular | Round | 118.4 | — | — | 120.0 | 63 |
| Example 41 | Cordierite | Pattern 1 | 254 | Quadrangular | Round | 143.8 | — | — | 203.2 | 48 |
| Comparative Example 5 | Cordierite | Pattern 1 | 254 | Quadrangular | Round | 143.8 | — | — | 203.2 | 48 |
| Example 42 | SiC | Pattern 1 | 300 | Quadrangular | Round | 143.8 | — | — | 254.0 | 58 |
| Comparative Example 6 | SiC | Pattern 1 | 300 | Quadrangular | Round | 143.8 | — | — | 254.0 | 58 |
| Example 43 | Cordierite | Pattern 1 | 300 | Quadrangular, octagonal | Round | 172 | — | — | 177.8 | 52 |
| Comparative Example 7 | Cordierite | Pattern 1 | 300 | Quadrangular, octagonal | Round | 172 | — | — | 177.8 | 52 |
| Example 44 | Cordierite | Pattern 1 | 203 | Quadrangular, octagonal | Elliptic | — | 228.6 | 137.2 | 203.2 | 58 |
| Comparative Example 8 | Cordierite | Pattern 1 | 203 | Quadrangular, octagonal | Elliptic | — | 228.6 | 137.2 | 203.2 | 58 |
| Example 45 | Cordierite | Pattern 1 | 254 | Hexagonal | Round | 172 | — | — | 177.8 | 52 |
| Comparative Example 9 | Cordierite | Pattern 1 | 254 | Hexagonal | Round | 172 | — | — | 177.8 | 52 |
| Example 46 | Cordierite | Pattern 1 | 300 | Hexagonal | Round | 143.8 | — | — | 203.2 | 65 |
| Comparative Example 10 | Cordierite | Pattern 1 | 300 | Hexagonal | Round | 143.8 | — | — | 203.2 | 65 |
| Example 47 | Cordierite | Pattern 1 | 165 | Quadrangular | Round | 143.8 | — | — | 152.4 | 48 |
| Comparative Example 11 | Cordierite | Pattern 1 | 165 | Quadrangular | Round | 143.8 | — | — | 152.4 | 48 |
| Example 48 | Cordierite | Pattern 1 | 254 | Quadrangular, octagonal | Round | 266.7 | — | — | 304.8 | 65 |
| Comparative Example 12 | Cordierite | Pattern 1 | 254 | Quadrangular, octagonal | Round | 266.7 | — | — | 304.8 | 65 |

TABLE 8

| | P1 (mm) | P2 (mm) | P1, P2 ratio (%) | Average of P1 and P2 (mm) | Curvature radius (μm) | X (%) | Cell structure |
|---|---|---|---|---|---|---|---|
| Comparative Example 1 | 1.47 | 1.47 | 0.0 | 1.47 | 0 | 0.0 | FIG. 4 |
| Example 40 | 1.49 | 1.47 | 1.3 | 1.48 | 20 | 1.4 | FIG. 4 |
| Comparative Example 2 | 1.55 | 1.47 | 5.2 | 1.51 | 0 | 0.0 | FIG. 4 |
| Comparative Example 3 | 1.47 | 1.47 | 0.0 | 1.47 | 5 | 0.3 | FIG. 4 |
| Comparative Example 4 | 1.47 | 1.47 | 0.0 | 1.47 | 310 | 21.1 | FIG. 4 |
| Example 41 | 1.47 | 1.47 | 0.0 | 1.47 | 50 | 3.4 | FIG. 8 |
| Comparative Example 5 | 1.47 | 1.47 | 0.0 | 1.49 | 0 | 0.0 | FIG. 8 |
| Example 42 | 1.47 | 1.47 | 0.0 | 1.47 | 50 | 3.4 | FIG. 10 |
| Comparative Example 6 | 1.47 | 1.47 | 0.0 | 1.515 | 0 | 0.0 | FIG. 10 |
| Example 43 | 1.46 | 1.47 | −0.7 | 1.465 | 80 | 5.5 | FIG. 12 |
| Comparative Example 7 | 1.47 | 1.47 | 0.0 | 1.535 | 0 | 0.0 | FIG. 12 |
| Example 44 | 1.48 | 1.47 | 0.7 | 1.475 | 50 | 3.4 | FIG. 14 |
| Comparative Example 8 | 1.49 | 1.47 | 1.3 | 1.48 | 0 | 0.0 | FIG. 14 |
| Example 45 | 1.46 | 1.47 | −0.7 | 1.465 | 50 | 3.4 | FIG. 16 |
| Comparative Example 9 | 1.47 | 1.47 | 0.0 | 1.535 | 0 | 0.0 | FIG. 16 |
| Example 46 | 1.37 | 1.37 | 0.0 | 1.37 | 100 | 7.3 | FIG. 18 |
| Comparative Example 10 | 1.37 | 1.37 | 0.0 | 1.62 | 2 | 0.1 | FIG. 18 |

TABLE 8-continued

|  | P1 (mm) | P2 (mm) | P1, P2 ratio (%) | Average of P1 and P2 (mm) | Curvature radius (μm) | X (%) | Cell structure |
|---|---|---|---|---|---|---|---|
| Example 47 | 1.80 | 1.80 | 0.0 | 1.8 | 70 | 3.9 | FIG. 4, FIG. 20 |
| Comparative Example 11 | 1.82 | 1.80 | 1.1 | 1.81 | 0 | 0.0 | FIG. 4, FIG. 20 |
| Example 48 | 1.46 | 1.47 | −0.7 | 1.465 | 50 | 3.4 | FIG. 12, FIG. 21 |
| Comparative Example 12 | 1.47 | 1.47 | 0.0 | 1.66 | 0 | 0.0 | FIG. 12, FIG. 21 |

TABLE 9

|  | Soot leakage | Pressure loss-1 | General judgment | Evaluation Pressure loss |
|---|---|---|---|---|
| Comparative Example 1 | D | A | NG | C |
| Example 40 | A | A | OK | C |
| Comparative Example 2 | D | A | NG | A |
| Comparative Example 3 | D | A | NG | C |
| Comparative Example 4 | A | C | NG | C |
| Example 41 | A | A | OK | C |
| Comparative Example 5 | C | A | NG | C |
| Example 42 | A | A | OK | C |
| Comparative Example 6 | C | A | NG | C |
| Example 43 | A | A | OK | C |
| Comparative Example 7 | C | A | NG | C |
| Example 44 | A | A | OK | C |
| Comparative Example 8 | D | A | NG | C |
| Example 45 | A | A | OK | C |
| Comparative Example 9 | D | A | NG | C |
| Example 46 | A | A | OK | C |
| Comparative Example 10 | D | A | NG | C |
| Example 47 | A | A | OK | C |
| Comparative Example 11 | D | A | NG | C |
| Example 48 | A | A | OK | C |
| Comparative Example 12 | C | A | NG | C |

TABLE 10

|  | Cell structure | | | | | | | | | |
|---|---|---|---|---|---|---|---|---|---|---|
|  | Material | Arrangement pattern | Thickness of partition walls (μm) | Cell shape | Sectional shape | Dia. (mm) | Long dia. (mm) | Short dia. (mm) | Total length (mm) | Porosity (%) |
| Comparative Example 13 | Cordierite | Pattern 2 | 203 | Quadrangular | Round | 118.4 | — | — | 120.0 | 52 |
| Example 49 | Cordierite | Pattern 2 | 203 | Quadrangular | Round | 118.4 | — | — | 120.0 | 52 |
| Comparative Example 14 | Cordierite | Pattern 2 | 203 | Quadrangular | Round | 118.4 | — | — | 120.0 | 63 |
| Comparative Example 15 | Cordierite | Pattern 2 | 203 | Quadrangular | Round | 118.4 | — | — | 120.0 | 63 |
| Example 50 | Cordierite | Pattern 2 | 254 | Quadrangular | Round | 143.8 | — | — | 203.2 | 48 |
| Comparative Example 16 | Cordierite | Pattern 2 | 254 | Quadrangular | Round | 143.8 | — | — | 203.2 | 48 |
| Example 51 | Cordierite | Pattern 2 | 300 | Quadrangular, octagonal | Round | 172 | — | — | 177.8 | 52 |
| Comparative Example 17 | Cordierite | Pattern 2 | 300 | Quadrangular, octagonal | Round | 172 | — | — | 177.8 | 52 |
| Example 52 | Cordierite | Pattern 2 | 203 | Quadrangular, octagonal | Elliptic | — | 228.6 | 137.2 | 203.2 | 58 |
| Comparative Example 18 | Cordierite | Pattern 2 | 203 | Quadrangular, octagonal | Elliptic | — | 228.6 | 137.2 | 203.2 | 58 |
| Example 53 | Cordierite | Pattern 2 | 254 | Hexagonal | Round | 172 | — | — | 177.8 | 52 |
| Comparative Example 19 | Cordierite | Pattern 2 | 254 | Hexagonal | Round | 172 | — | — | 177.8 | 52 |
| Example 54 | Cordierite | Pattern 2 | 300 | Hexagonal | Round | 143.8 | — | — | 203.2 | 65 |
| Comparative Example 20 | Cordierite | Pattern 2 | 300 | Hexagonal | Round | 143.8 | — | — | 203.2 | 65 |
| Example 55 | Cordierite | Pattern 2 | 165 | Quadrangular | Round | 143.8 | — | — | 152.4 | 48 |
| Comparative Example 21 | Cordierite | Pattern 2 | 165 | Quadrangular | Round | 143.8 | — | — | 152.4 | 48 |
| Example 56 | Cordierite | Pattern 2 | 254 | Quadrangular, octagonal | Round | 266.7 | — | — | 304.8 | 65 |
| Comparative Example 22 | Cordierite | Pattern 2 | 254 | Quadrangular, octagonal | Round | 266.7 | — | — | 304.8 | 65 |

TABLE 11

| | P1 (mm) | P2 (mm) | P1, P2 ratio (%) | Average of P1 and P2 (mm) | Curvature radius (μm) | X (%) | Cell structure |
|---|---|---|---|---|---|---|---|
| Comparative Example 13 | 1.47 | 1.47 | 0.0 | 1.47 | 0 | 0.0 | FIG. 24 |
| Example 49 | 1.49 | 1.47 | 1.3 | 1.48 | 20 | 1.4 | FIG. 24 |
| Comparative Example 14 | 1.47 | 1.47 | 0.0 | 1.47 | 5 | 0.3 | FIG. 24 |
| Comparative Example 15 | 1.47 | 1.47 | 0.0 | 1.47 | 310 | 21.1 | FIG. 24 |
| Example 50 | 1.47 | 1.47 | 0.0 | 1.47 | 50 | 3.4 | FIG. 26 |
| Comparative Example 16 | 1.47 | 1.47 | 0.0 | 1.49 | 0 | 0.0 | FIG. 26 |
| Example 51 | 1.46 | 1.47 | −0.7 | 1.465 | 80 | 5.5 | FIG. 28 |
| Comparative Example 17 | 1.47 | 1.47 | 0.0 | 1.535 | 0 | 0.0 | FIG. 28 |
| Example 52 | 1.48 | 1.47 | 0.7 | 1.475 | 50 | 3.4 | FIG. 30 |
| Comparative Example 18 | 1.47 | 1.47 | 0.0 | 1.48 | 0 | 0.0 | FIG. 30 |
| Example 53 | 1.46 | 1.47 | −0.7 | 1.465 | 50 | 3.4 | FIG. 32 |
| Comparative Example 19 | 1.47 | 1.47 | 0.0 | 1.535 | 0 | 0.0 | FIG. 32 |
| Example 54 | 1.37 | 1.37 | 0.0 | 1.37 | 100 | 7.3 | FIG. 34 |
| Comparative Example 20 | 1.37 | 1.37 | 0.0 | 1.62 | 2 | 0.1 | FIG. 34 |
| Example 55 | 1.80 | 1.80 | 0.0 | 1.8 | 70 | 3.9 | FIG. 24, FIG. 20 |
| Comparative Example 21 | 1.82 | 1.80 | 1.1 | 1.81 | 0 | 0.0 | FIG. 24, FIG. 20 |
| Example 56 | 1.46 | 1.47 | −0.7 | 1.465 | 50 | 3.4 | FIG. 28, FIG. 21 |
| Comparative Example 22 | 1.47 | 1.47 | 20.5 | 1.66 | 0 | 0.0 | FIG. 28, FIG. 21 |

TABLE 12

| | Evaluation 1 | | | Evaluation 2 |
|---|---|---|---|---|
| | Soot leakage | Pressure loss-1 | General judgment | Pressure loss-2 |
| Comparative Example 13 | D | A | NG | C |
| Example 49 | A | A | OK | C |
| Comparative Example 14 | C | A | NG | C |
| Comparative Example 15 | A | C | NG | C |
| Example 50 | A | A | OK | C |
| Comparative Example 16 | C | A | NG | C |
| Example 51 | A | A | OK | C |
| Comparative Example 17 | C | A | NG | C |
| Example 52 | A | A | OK | C |
| Comparative Example 18 | D | A | NG | C |
| Example 53 | A | A | OK | C |
| Comparative Example 19 | D | A | NG | C |
| Example 54 | A | A | OK | C |
| Comparative Example 20 | D | A | NG | C |
| Example 55 | A | A | OK | C |
| Comparative Example 21 | D | A | NG | C |
| Example 56 | A | A | OK | C |
| Comparative Example 22 | C | A | NG | C |

(Result)

In the honeycomb filters of Examples 1 to 56, in the evaluation of the soot leakage, the soot leakage from each honeycomb filter was not confirmed, and the result was evaluation "A". Furthermore, in the honeycomb filters of Examples 1 to 56, the result was also "A" in the evaluation of "pressure loss-1". Consequently, in all of the honeycomb filters of Examples 1 to 56, a result of "OK" was obtainable in the general judgment. On the other hand, the honeycomb filters of Comparative Examples 1 to 22 failed in at least one of two evaluations of "soot leakage" and "pressure loss-1", and a result of "NG" was obtained in the general judgment.

Furthermore, the honeycomb filters of Examples 1 to 39 had a constitution in which a value of "P1, P2 ratio (%)" of Table 2 and Table 5 satisfied the relation of Equation (2) mentioned above, and in the honeycomb filters, an excellent result was also obtainable in the evaluation of "pressure loss-2".

A honeycomb filter of the present invention is utilizable as a filter to trap particulate matter in an exhaust gas.

DESCRIPTION OF REFERENCE NUMERALS 1, 21 and 41: partition wall, 2, 22 and 42: cell, 2a, 22a and 42a: inflow cell, 2b, 22b and 42b: outflow cell, 2c, 22c and 42c: through-cell, 3: circumferential wall, 4, 24 and 44: honeycomb structure body, 5, 25 and 45: plugging portion, 6: corner portion, 11, 31 and 51: inflow end face, 12 and 32: outflow end face, 15, 35 and 55: first cell row, 16, 36 and 56: second cell row, 64: honeycomb segment, 65: bonding layer, 100, 200, 300, 400, 500, 600, 700, 800, 900, 1000, 1100, 1200, 1300, 1400, 1500, 1600, 2000, 2100, 2200 and 3000: honeycomb filter, P1: width (the width of the first cell row), and P2: width (the width of the second cell row).

What is claimed is:

1. A honeycomb filter comprising:
a honeycomb structure body having porous partition walls arranged to surround a plurality of cells extending from an inflow end face to an outflow end face to form through channels for a fluid, and
a plugging portion disposed to plug either one of end portions of each of cells of parts of the plurality of cells on the side of the inflow end face or the side of the outflow end face,
wherein among the plurality of cells, cells in which the plugging portions are arranged in end portions on the outflow end face side and which are opened on the inflow end face side are defined as inflow cells, cells in which the plugging portions are arranged in end portions on the inflow end face side and which are opened on the outflow end face side are defined as outflow cells, cells in which the plugging portions are not arranged and which are opened on both of the inflow end face side and the outflow end face side are defined as through-cells, the honeycomb structure body has a plurality of cell rows in which two or more cells are linearly arranged along one direction, in a cross section of the honeycomb structure body which is perpendicular to an extending direction of the cells, the plurality of cell rows include a first cell row and a second cell row, the first cell row is a cell row constituted of at least one of the inflow cell and the outflow cell, and the through-cell, the second cell row is a cell row which does not include the through-cells in the cells linearly arranged along the one direction, in the cross section perpendicular to the extending direction of the cells, each of the cells has a polygonal shape of which corner portions are formed in a curved shape of a curvature radius R, a width P1 (mm) of the first cell row, a width P2 (mm) of the second cell row and the curvature radius R (μm) satisfy a relation of Equation (1) mentioned below:

$$0.4 \leq (R/1000)/((P1+P2)/2) \times 100 \leq 20, \text{ and} \qquad \text{Equation (1):}$$

the width P1 (mm) of the first cell row and the width P2 (mm) of the second cell row satisfy a relation of Equation (2) mentioned below:

$$2 \leq 100-(P2/P1 \times 100) \leq 50. \qquad \text{Equation (2):}$$

2. The honeycomb filter according to claim 1, wherein an average value of the width P1 of the first cell row and the width P2 of the second cell row is from 0.7 to 3.5 mm.

3. The honeycomb filter according to claim 1, wherein the width P1 of the first cell row is from 0.7 to 4.0 mm.

4. The honeycomb filter according to claim 1, wherein the width P2 of the second cell row is from 0.7 to 2.7 mm.

5. The honeycomb filter according to claim 1, wherein in the cross section perpendicular to the extending direction of the cells, a ratio N2/N1 of the number N2 of the second cell rows to the number N1 of the first cell rows is from 1/4 to 4.0.

6. The honeycomb filter according to claim 1, wherein in the first cell row, the inflow cells and the through-cells are alternately arranged in a row extending direction.

7. The honeycomb filter according to claim 1, wherein in the first cell row, the outflow cells and the through-cells are alternately arranged in a row extending direction.

8. The honeycomb filter according to claim 1, wherein in the second cell row, the inflow cells and the outflow cells are alternately arranged in a row extending direction.

9. The honeycomb filter according to claim 1, wherein the second cell rows include a cell row in which only the inflow cells are linearly arranged along the one direction.

10. The honeycomb filter according to claim 1, wherein the second cell rows further include a cell row in which only the outflow cells are linearly arranged along the one direction.

11. The honeycomb filter according to claim 1, comprising two or more regions having different constitutions of the cell row in the cross section perpendicular to the extending direction of the cells, wherein the honeycomb structure body is present in at least a part of the region.

12. The honeycomb filter according to claim 1, comprising a plurality of honeycomb structure bodies, wherein each of the honeycomb structure bodies is constituted of a pillar-shaped honeycomb segment, and side surfaces of a plurality of honeycomb segments are bonded to one another by a bonding layer.

* * * * *